US006802061B1

(12) United States Patent
Parthasarathy et al.

(10) Patent No.: US 6,802,061 B1
(45) Date of Patent: *Oct. 5, 2004

(54) AUTOMATIC SOFTWARE DOWNLOADING FROM A COMPUTER NETWORK

(75) Inventors: Srivatsan Parthasarathy, Woodinville, WA (US); Hadi Partovi, Seattle, WA (US); Benjamin W. Slivka, Bellevue, WA (US); Charles E. Kindel, Jr., Seattle, WA (US)

(73) Assignee: Microsoft Corporation, Redmond, WA (US)

(*) Notice: Subject to any disclaimer, the term of this patent is extended or adjusted under 35 U.S.C. 154(b) by 60 days.

This patent is subject to a terminal disclaimer.

(21) Appl. No.: 10/027,209

(22) Filed: Dec. 21, 2001

Related U.S. Application Data

(63) Continuation of application No. 09/436,185, filed on Nov. 8, 1999, which is a continuation of application No. 08/764,040, filed on Dec. 12, 1996, now abandoned.

(51) Int. Cl.[7] .............................. G06F 9/44; G06F 9/445
(52) U.S. Cl. ......................... 717/173; 717/178; 717/120
(58) Field of Search ................................ 717/168, 173, 717/174, 178, 171, 172, 175, 170, 120, 121, 122

(56) References Cited

U.S. PATENT DOCUMENTS

| 4,558,413 A | 12/1985 | Schmidt et al. ............. 717/178 |
| 4,796,181 A | 1/1989 | Wiedemer .................... 705/52 |
| 4,953,209 A | 8/1990 | Ryder, Sr. et al. ............. 705/59 |
| 4,982,430 A | 1/1991 | Frezza et al. ................ 380/211 |
| 5,003,591 A | 3/1991 | Kauffman et al. .......... 380/232 |
| 5,047,928 A | 9/1991 | Wiedemer .................... 705/52 |
| 5,142,680 A | 8/1992 | Ottman et al. .............. 717/176 |
| 5,155,484 A | 10/1992 | Chambers, IV .............. 341/55 |
| 5,155,680 A | 10/1992 | Wiedemer .................... 705/52 |
| 5,155,847 A | 10/1992 | Kirouac et al. ............. 709/221 |
| 5,247,683 A | 9/1993 | Holmes et al. ............. 709/221 |
| 5,267,171 A | 11/1993 | Suzuki et al. ............... 700/234 |
| 5,337,360 A | 8/1994 | Fischer ....................... 713/176 |
| 5,367,621 A | 11/1994 | Cohen et al. ............. 715/501.1 |
| 5,367,686 A | 11/1994 | Fisher et al. ................ 717/174 |
| 5,388,211 A | 2/1995 | Hornbuckle ................ 717/178 |
| 5,390,247 A | 2/1995 | Fischer ....................... 713/176 |

(List continued on next page.)

FOREIGN PATENT DOCUMENTS

EP 0 677 809 A1 3/1995

OTHER PUBLICATIONS

Sara Williams; Summer 1996; *Microsoft Interactive Developer*; "Internet Component Download"; pp. 49–52.

Rozenblit, "O, A & M Capabilities for Switching Software Management," IEEE Global Telecommunications Conference, 1993, pp. 357–361.

Mori et al., "Superdistribution: The Concept and the Architecture," *The Transactions of the IEICE*, vol. E73, No. 7, pp. 1133–1146 (Jul. 1990).

(List continued on next page.)

*Primary Examiner*—Anthony Knight
*Assistant Examiner*—Kelvin Booker
(74) *Attorney, Agent, or Firm*—Klarquist Sparkman, LLP

(57) ABSTRACT

Methods and systems automatically download computer software components from a computer network like the Internet or an intranet. The methods and systems can be used to provide dynamic or interactive multimedia components in HTML documents with HTML <OBJECT> tags. The HTML <OBJECT> tags can contain parameters including uniform resource locators (URLs) which reference dynamic or interactive multimedia components on remote computers. Network browsers and other applications can obtain computer software components from a computer network like the Internet or an intranet in a uniform, portable, architecture-neutral, robust manner. The computer software components obtained can be used to provide a variety of new multimedia functionality to an application program.

26 Claims, 8 Drawing Sheets

U.S. PATENT DOCUMENTS

| | | | | |
|---|---|---|---|---|
| 5,421,009 A | | 5/1995 | Platt | 709/221 |
| 5,473,772 A | | 12/1995 | Halliwell et al. | 717/171 |
| 5,495,411 A | | 2/1996 | Ananda | 705/32 |
| 5,496,177 A | | 3/1996 | Collia et al. | 434/118 |
| 5,528,490 A | | 6/1996 | Hill | 717/168 |
| 5,548,645 A | | 8/1996 | Ananda | 705/52 |
| 5,555,416 A | | 9/1996 | Owens | 717/178 |
| 5,586,304 A | | 12/1996 | Stupek, Jr. et al. | 717/170 |
| 5,586,322 A | | 12/1996 | Beck et al. | 707/200 |
| 5,638,446 A | | 6/1997 | Rubin | 705/51 |
| 5,654,746 A | | 8/1997 | McMullan, Jr. et al. | 725/29 |
| 5,654,901 A | | 8/1997 | Boman | 717/173 |
| 5,678,002 A | | 10/1997 | Fawcett et al. | 345/709 |
| 5,694,546 A | | 12/1997 | Reisman | 705/26 |
| 5,701,451 A | | 12/1997 | Rogers | 707/1 |
| 5,706,502 A | | 1/1998 | Foley | 707/10 |
| 5,708,709 A | | 1/1998 | Rose | 705/59 |
| 5,710,918 A | | 1/1998 | Lagarde | 707/10 |
| 5,717,930 A | | 2/1998 | Imai et al. | 717/176 |
| 5,721,824 A | | 2/1998 | Taylor | 709/203 |
| 5,732,275 A | | 3/1998 | Kullick | 717/170 |
| 5,742,829 A | | 4/1998 | Davis et al. | 707/203 |
| 5,748,960 A | | 5/1998 | Fischer | 709/316 |
| 5,761,499 A | | 6/1998 | Sonderegger | 707/10 |
| 5,764,992 A | | 6/1998 | Kullick et al. | 717/170 |
| 5,781,707 A | | 7/1998 | Kunz et al. | 358/1.15 |
| 5,809,287 A | | 9/1998 | Stupek, Jr. et al. | 703/22 |
| 5,835,777 A | | 11/1998 | Staelin | 717/175 |
| 5,838,906 A | | 11/1998 | Doyle et al. | 709/202 |
| 5,845,077 A | | 12/1998 | Fawcett | 717/173 |
| 5,845,090 A | | 12/1998 | Collins, III et al. | 709/221 |
| 5,860,012 A | | 1/1999 | Luu | 717/175 |
| 5,862,362 A | | 1/1999 | Somasegar et al. | 703/21 |
| 5,881,236 A | | 3/1999 | Dickey | 709/221 |
| 5,909,545 A | | 6/1999 | Frese, II et al. | 708/208 |
| 5,909,581 A | | 6/1999 | Park | 717/170 |
| 5,913,040 A | | 6/1999 | Rakavy et al. | 709/232 |
| 5,960,189 A | | 9/1999 | Stupek, Jr. et al. | 717/169 |
| 5,999,740 A | | 12/1999 | Rowley | 717/173 |
| 6,006,034 A | | 12/1999 | Heath et al. | 717/170 |
| 6,009,274 A | | 12/1999 | Fletcher et al. | 717/713 |
| 6,016,520 A | | 1/2000 | Faq et al. | 710/33 |
| 6,049,671 A | * | 4/2000 | Slivka et al. | 717/173 |
| 6,074,434 A | | 6/2000 | Cole et al. | 717/713 |
| 6,091,411 A | | 7/2000 | Straub et al. | 345/747 |
| 6,151,643 A | | 11/2000 | Cheng et al. | 710/36 |
| 6,240,360 B1 | | 5/2001 | Phelan | 701/208 |
| 6,256,668 B1 | | 7/2001 | Slivka et al. | 709/220 |
| 6,347,398 B1 | * | 2/2002 | Parthasarathy et al. | 717/178 |

OTHER PUBLICATIONS

Pei Wei, O'Reilly & Associates, "WWW Browsers: Extensibility Issues," *Stanford Computer Forum WWW Workshop*, 1 page, Sep. 20–21 (1994).

Pei Wei, O'Reilly & Associates, "Extensibility in WWW Browsers," *Standford Computer Forum WWW Workshop*, 3 pages, Sep. 20–21 (1994).

Raggett et al., *HTML 3 Electronic Publishing on the World Wide Web*, Addison Wesley Longman, pp. 219–220, 228–241, Jun. 1996.

Balderston, "Oil Change Tops Off PC's with Automatic Software Updates," *Info World*, vol. 18, No. 22, p. 50, May 27, 1996.

"Mercury Operator's Log: Oct. 26–Dec. 1, 1994," http://www.usc.edu/dept/raiders/logs/alpha–log–941202–941224.html, Dec. 24, 1994.

Lichty, *American Online's Internet Windows Edition*, pp. 135–167, 170–178, 1994.

Lichty, *The Official America Online for Macintosh Tour Guide*, pp. 123–163, 1994.

Flavin et al., "Management of Distributed Applications in Large Networks," *IEEE*, pp. 232–241, 1998.

Smalley, "Hermes Nears Finish Line; Bloodhound will be Part of Summer Debut," *PC Week*, vol. 11, No. 19, p. 31, May 16, 1994.

Moore, "SMS Debut Draws Crowds, Queries; Corporate Role Remains Uncertain," *Computerworld*, vol. 28, No. 38, p. 14 (Abstract only), Sep. 19, 1994.

Darrow et al., "Microsoft Debuts Low–Cost NT 3.5," *Computer Reseller News*, No. 596, pp. 1–2 (Abstract only, 1 page), Sep. 19, 1994.

"The Viola Home Page," http://www.viola.org, p. 1, prior Dec. 12, 1996.

"Viola in a Nutshell," http://www.viola.org/book/preface.html, pp. 1–3, prior to Dec. 12, 1996.

"Viola WWW Features List," http://www.viola.org/vwFeatures.html, p. 1, prior to Dec. 12, 1996.

"Extensibility and Mini Applications," http://www.viola.org/book/chp13.html, pp. 1–10, prior to Dec. 12, 1996.

www.viola.org, "A Brief Overview of the VIOLA Engine, and its Applications," 15 pages, (prior to Dec. 12, 1996).

Jaeger et al., "Preserving intergrity in remote file location and retrieval," Proceedings of the Symposium on Network and Distributed System Security, pp. 53–63, Feb. 1996.

"New Cybermedia Oil Change Software Will Keep Windows PC Software Up–to–Date Automatically," PR Newswire, 1 page, May 14, 1996.

"Position Briefing: Oil Change Can Lower Both User and Vendor Tech Support Costs," PR Newswire, 1 page, May 14, 1996.

"Product Briefing: Cybermedia Oil Change Software: How It Works," PR Newswire, 1 page, May 14, 1996.

Williams et al., "The component object model," Dr. Dobbs Journal, vol. 1994, Issue S14, Jun. 1994.

Branwyn, "Getting Started, Mosaic Quick Tour For Windows—Accessing and Navigating The Internet's World Wide Web," Ventanan Press, Inc., pp. 11–26, 1994.

Branwyn, "Mosaic Quick Tour For Windows—Accessing and Navigating The Internet's World Wide Web," Ventana Press, Inc., pp. 104–112, 1994.

Lebel et al., "LUDE," A Distributed Software Library, 33 pages, Oct. 25, 1995.

Raggett, "HyperText Markup Language Specification Version 3.0," Internet Draft, 190 pages ( 181 sheets), Mar. 28, 1995.

Schroeder et al., "Windows 95 Rushes The Net: Netscape, Microsoft, Others Release New Browsers. (Netscape Communications' Navigator 1.2 for Windows 95, Microsoft's Internet Explorer and Ipswitch's CyberSuite)(Product Announcement)," PC Week, 2 pages, Aug. 28, 1995.

Walsh, "Foundations of Java Programming For The World Wide Web," Chapters 6 and 19, IDG Books Worldwide, Inc., 83 pages, Jul. 1996.

Wingfield, "Netscape Inks Pact With Sun, Macromedia. (Netscape Communications Newscape Navigator, Sun Microsystyems Java Programming Language," InfoWorld, 2 pages, May 29, 1995.

* cited by examiner

AUTOMATIC SOFTWARE DOWNLOADING FROM A COMPUTER NETWORK

CONTINUING APPLICATION DATA

This application is a continuation of U.S. patent application Ser. No. 09/436,185, to Parthasarathy et al., entitled, "Automatic Software Downloading From a Computer Network," filed Nov. 8, 1999, which is hereby incorporated herein by reference, and which is a continuation of U.S. patent application number 08/764,040, to Parthasarathy et al., entitled "Automatic Software Downloading From a Computer Network," filed Dec. 12, 1996 now abandond which is hereby incorporated herein by reference.

TECHNICAL FIELD

The present invention relates to browsing of information on computer networks. More particularly, the present invention relates to automatically downloading, verifying, installing, registering and displaying computer software components from computer networks like the Internet or an intranet.

BACKGROUND AND SUMMARY

The Internet is a worldwide network of cooperating computer networks. Connected to the Internet are thousands of individual computers, each with a variety of application programs. From a user's point of view, access to the Internet and its services typically are accomplished by invoking a network application program (e.g., a network browser). The network application program acts as an interface between the user and the Internet. Network application programs are typically "client" applications that accept commands from the user and obtain Internet data and services by sending requests to "server" applications on other computers at other locations on the Internet.

There are many types of client network applications known in the art including network browsers such as the MICROSOFT INTERNET EXPLORER software by Microsoft Corporation of Redmond, Wash., the NETSCAPE NAVIGATOR software by Netscape Communications of Mountain View, Calif., and the MOSAIC software by National Center for Super Computer Applications (NCSA) in Champaign-Urbana, Ill. These network browsers send network requests via the File Transfer Protocol (FTP), Simple Mail Transfer Protocol (SMTP), Hyper Text Transfer Protocol (HTTP), Gopher document protocol and others. The network requests are used to exchange data with computer networks such as the Internet.

HTTP is a protocol used to access data on the World Wide Web. The World Wide Web is an information service on the Internet containing documents created in the Hyper Text Markup Language (HTML). HTML allows embedded "links" to point to other data or documents, which may be found on the local computer or other remote Internet host computers. HTML document links may retrieve the data by use of HTTP, FTP, Gopher, or other Internet application protocols. The Virtual Reality Modeling Language (VRML) is also used to create documents for the World Wide Web. Specifically, VRML is typically used to create three-dimensional graphical documents.

The bulk of the information on World Wide Web is static and non-interactive documents created with HTML. These HTML documents contain text and still images, while a number contain short audio and video clips. As the content of information stored on the Internet and World Wide Web evolves, it is desirable to insert dynamic multimedia components (e.g., animated buttons, scrolling banners, blinking lights, bouncing or spinning objects, high quality music, and full motion video) and interactive multimedia components (e.g., a computer game sent over the Internet and played against one or more other users, or a remote computer) into a HTML document, to make the information more attractive and interesting to a user browsing the HTML document.

Network browsers currently support a number of dynamic and pseudo-interactive multimedia components directly. However, there are a number of problems currently associated with using dynamic and pseudo-interactive multimedia components in a HTML document. These browsers may still require a user to initiate any dynamic multimedia interaction. For example, a user typically must request the dynamic multimedia interaction by selecting a remote link with input from a keyboard, electronic mouse or other pointing device. Thus, a user cannot be provided dynamic multimedia automatically without first asking for it. This again prevents a user from fully enjoying dynamic multimedia components.

Since the World Wide Web and the Internet currently support a wide variety of information in multiple formats, a typical network browser cannot directly display every possible dynamic multimedia format it encounters. When a network browser encounters a multimedia component in a HTML document the browser is unable to handle directly (e.g., color images with a large number of colors, high quality audio, full motion video), it is common in the art for the network browser to call a helper application (e.g., a help wizard) that can handle the multimedia component. The multimedia component is handed off to the helper application for processing (e.g., playing the audio, full motion video). The constantly changing nature of information on the Internet and World Wide Web requires that the network browser be updated constantly with access to new helper applications. This is a time consuming process for the network browser creators, and prevents a user from fully enjoying new multimedia components that might be encountered.

Another frequent problem is that a HTML document may contain a non-standard HTML tag that describes a new dynamic multimedia component. Non-standard HTML tags cause users to constantly incorporate new updates into their browsers to take advantage of the dynamic multimedia described by the non-standard HTML tags. This is also a slow and time consuming process and may require an additional helper application as was described above.

Most network browsers also do not currently support true interactive multimedia. Most Internet and World Wide Web sites require a user to fill out and submit an electronic form and rely on a Common Gateway Interface (CGI) application, to invoke a remote software application to provide pseudo-interactive multimedia content (e.g., database access, search engines, protocol gateways). The CGI provides a mechanism for information retrieval, processing and formatting within a HTML document. CGI applications are typically written in a programming language or scripting language other than HTML (e.g., C, C++, Perl, UNIX shell language) and are executed on a remote computer. This remote execution is typically a slow and cumbersome interface process that also requires input (e.g., a mouse click) from a user.

In accordance with an illustrative embodiment of the present invention, the problems of handling dynamic and interactive multimedia in a HTML document are overcome. A method and system for automatically locating, downloading, verifying, registering, installing and displaying a software component from a remote computer is provided.

The method is used to automatically locate, download, verify, install, register, and display a computer software component obtained from a remote computer. The system includes a software component download module for locating computer software components with uniform resource locators (URLs), registering computer software components in a registry database, and displaying computer software components on a local computer. The software component download module also manages other system modules. A data download module downloads computer software components in an asynchronous manner from one or more remote computers. A code verification module verifies that the downloaded computer software components are safe to install on a local computer by verifying a digital signature and digital certificate sent with the downloaded computer software component. A code installation module installs the verified computer software components on the local computer. The software components are not limited to the display of multimedia information. Almost any software component can be downloaded, verified, and installed via the described method and system, whether it is an ACTIVEX Control, a NETSCAPE ONE Plugin, a JAVA class library, a multimedia player, a document viewer, or a custom control or applet for inclusion on a digital form or a digital document.

The method and system are used by applications (e.g., network browsers, network servers) to automatically download and install software components from code depositories on computer networks (e.g., the Internet, or local corporate intranets) to provide dynamic and truly interactive multimedia to a user. The method and system allow any software component, including dynamic and interactive multimedia components, to be described with a standard tag (e.g., the <OBJECT> tag) in a HTML document.

When the <OBJECT> tag is encountered in a HTML document during browsing with a network browser, the multimedia software components referenced by the <OBJECT> tag are automatically downloaded and displayed directly on a user's computer. A HTML document can now provide dynamic multimedia content and true interactivity, in a uniform, portable, architecture-neutral, robust manner using the method and system of the present invention.

Network browsers will no longer require frequent updates or help applications to provide dynamic and truly interactive multimedia to a user. A user browsing an HTML document can now be provided with dynamic and interactive multimedia automatically and take full advantage of the variety of multimedia provided the World Wide Web, the Internet, and other computer networks such as intranets.

In addition, the method and system can also be used by applications or devices which are not network browsers (e.g. set top boxes for television network computers, satellite receiver boxes, digital personal assistants and wireless personal communications devices) to automatically locate, download, verify, install, register and display virtually any type of computer software component on any remote computer connected to a computer network like the Internet or an intranet. Any application which desires information from a remote computer can use the method and system of the present invention by sending the proper parameter information to the appropriate interfaces provided by the method and system.

The foregoing and other features and advantages of the illustrated embodiment of the present invention will be more readily apparent from the following detailed description, which proceeds with reference to the accompanying drawings.

DETAILED DESCRIPTION OF EMBODIMENTS

Figure 1:
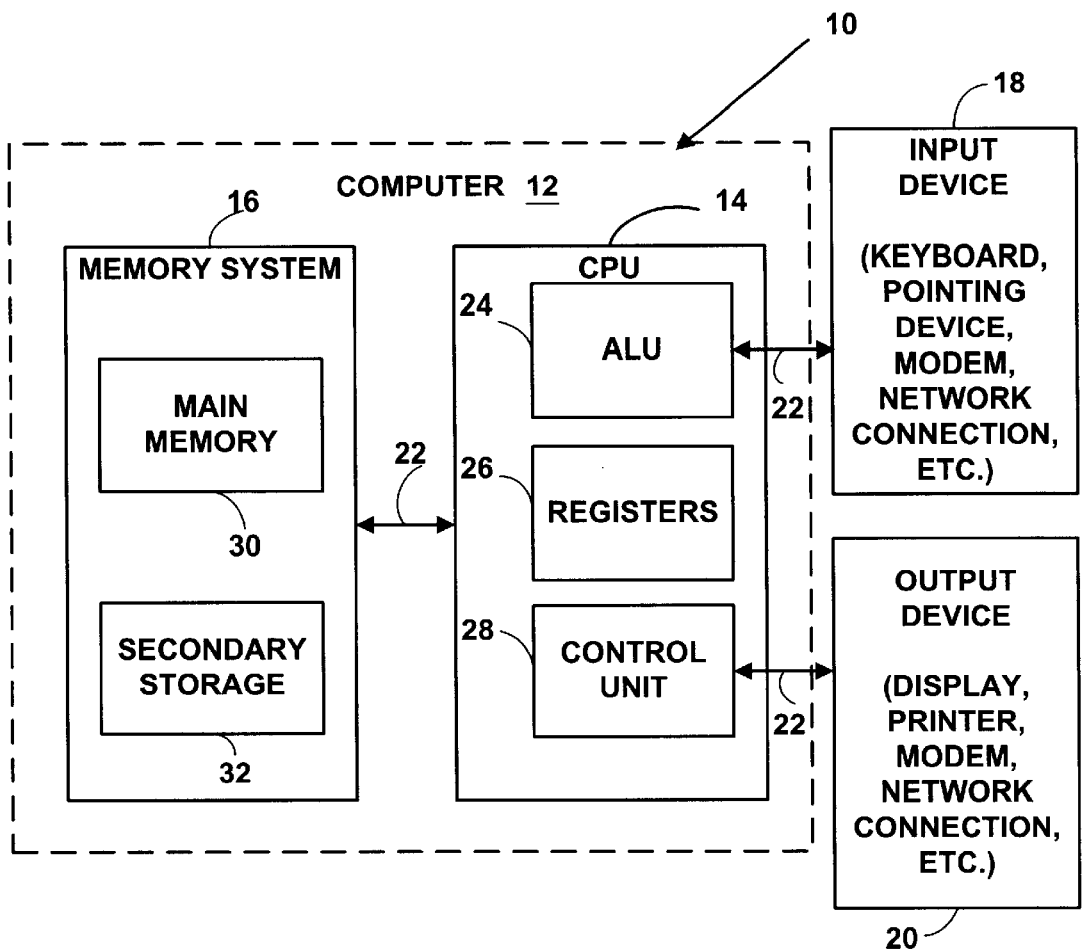
FIG. 1 is a block diagram of a computer system used to implement an illustrative embodiment of the present invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun Microsystems, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high-speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g., a microphone, etc.), or any other device providing input to the computer system 10. The output device 20 can comprise a display, a printer, an audio device (e.g., a speaker, etc.), or other device providing output to the computer system 10. The input/output devices 18, 20 can also include network connections (e.g., Internet and intranet connections), modems, or other devices used for communications with other computer systems or devices.

As is familiar to those skilled in the art, the computer system 10 further includes an operating system and at least one application program. The operating system is a set of software that controls the computer system's operation and the allocation of resources. The application program is a set of software that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks and any other volatile or non-volatile mass storage system readable by the computer 12. The computer readable medium includes cooperating or interconnected computer readable media, which exist exclusively on computer system 10 or are distributed among multiple interconnected computer systems 10 that may be local or remote.

In an illustrative embodiment of the present invention, the computer system 10 preferably uses the WINDOWS 95 client/server operating system. However, other client/server operating systems (e.g. the MICROSOFT WINDOWS NT operating system, the OS/2 operating system by IBM, the MAC OS operating system, the UNIX operating system, the MICROSOFT WINDOWS CE operating system, etc.) could also be used. A client/server operating system is an operating system which is divided into multiple processes of two different types: server processes, each of which typically implements a single set of services, and client processes, which request a variety of services from the server processes. Object oriented programming is used to design the client/server operating system, and applications that run under the client/server operating system, where objects represent system resources.

For example, the MICROSOFT WINDOWS 95 client/server operating system provides shareable resources, such as files, memory, processes and threads, which are implemented as "objects" and are accessed by using "object services." As is well known in the art, an "object" is a data structure whose physical format is hidden behind a type definition. Data structures, also referred to as records or formats, are organization schemes applied to data so that it can be interpreted, and so that specific operations can be performed on that data. Such data structures impose a physical organization on the collection of data stored within computer memory 16 and represent specific electrical, magnetic or organic elements.

An "object type," also called an "object class," comprises a data-type, services that operate on instances of the data type, and a set of object attributes. An "object attribute" is a field of data in an object that partially defines that object's state. An "object service" implements and manipulates objects, usually by reading or changing the object attributes. "Object oriented design" is a software development technique in which a system or component is expressed using objects.

An object typically has two components: a function table, containing a pointer to each object member function (i.e., sometimes known as an object method) defined in the object's class, and a data block, containing the current values for each object variable (i.e., data members, sometimes known as an object property). An application has some reference to an object through an object pointer. An application obtains this object reference by using some type of function call (direct or implied) in which that function allocates an object block in computer memory, initializes the function table, and returns the reference to the computer memory to an application. The computer memory may be local or distributed on a remote computer.

The MICROSOFT WINDOWS 95 operating system allows users to execute more than one program at a time by organizing the many tasks that it must perform into "processes." The operating system allocates a portion of the computer's resources to each process and ensures that each process's program is dispatched for execution at the appropriate time and in the appropriate order.

In an illustrative embodiment of the present invention, processes are implemented as objects. A process object comprises the following elements: an executable program; a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The Component Object Model (COM) and Distributed Component Object Model (DCOM) are models used for object oriented programming. The COM and DCOM specifies how objects within a single application or between applications (e.g. client/server applications) interact and communicate by defining a set of standard interfaces. Interfaces are groupings of semantically related functions through which a client application accesses the services of a server application.

Object Linking and Embedding (OLE), such as OLE Version 2 by the Microsoft Corporation of Redmond, Wash., and ACTIVEX (network activation controls) technology are based in part on the Component Object Model and allows the creation of objects of different formats which operate on data through defined interfaces, rather than operating on the applications responsible for the data. ACTIVEX technology is based in part on OLE technologies. The object data can be embedded within an object, or linked to it, so that only a link reference to the data is stored in the object.

Figure 2:
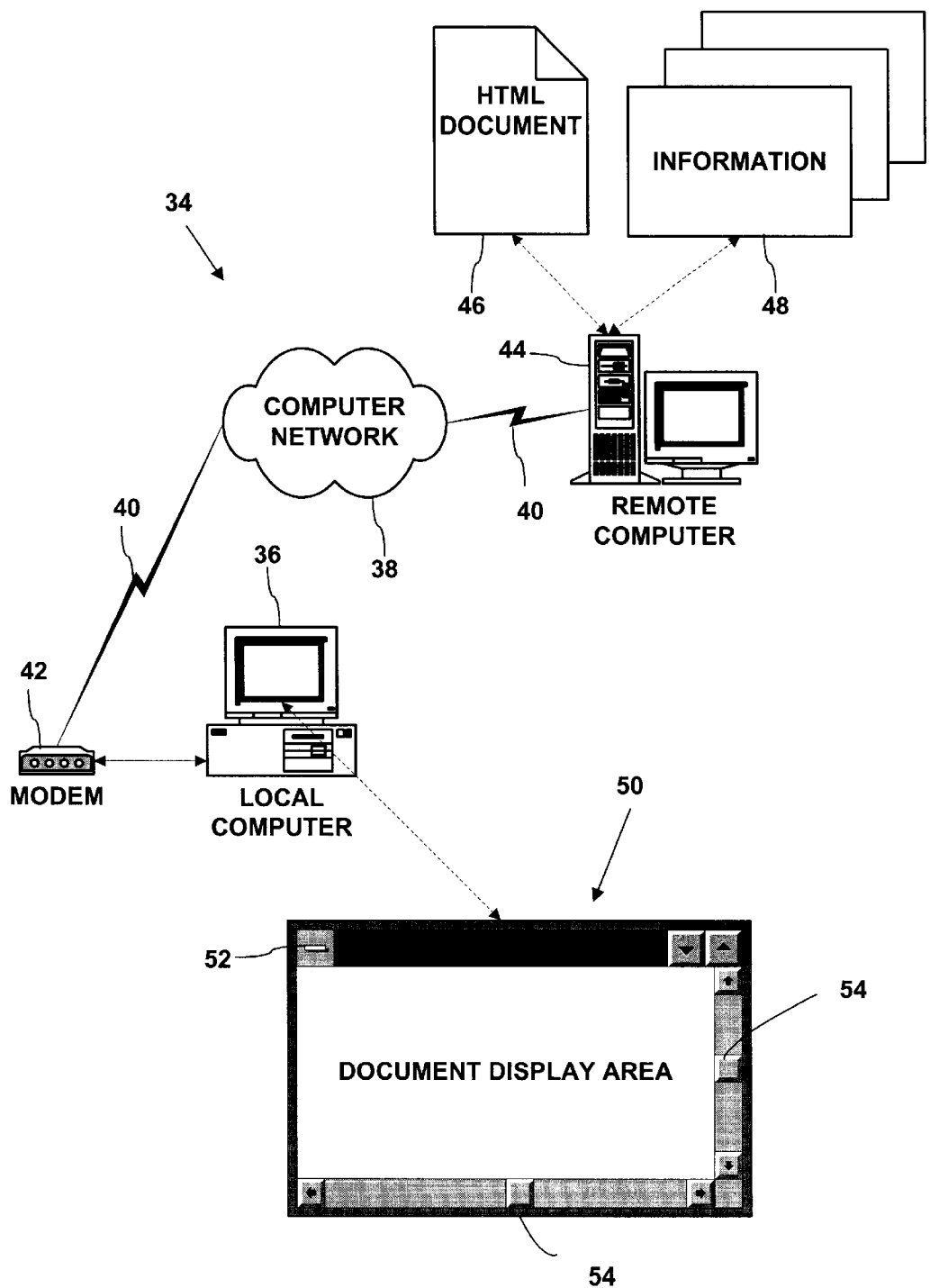
FIG. 2 is a block diagram illustrating a network browsing environment.

In a browsing environment 34 of an illustrative embodiment of the present invention shown in FIG. 2, a local computer 36 (e.g., computer system 10 shown in FIG. I) runs software, referred to herein as a "browser," for unified browsing of electronic documents and other data from local sources (e.g., the memory system 16 of FIG. 1) and from a computer network 38 (e.g., the Internet, an intranet). The browser can be integrated with the operating system software, or can be a separate application software. The browser is typically an object oriented application. The illustrated remote computer network 38 is the Internet, which is described in the Background and Summary section above. In the illustrated browsing environment 34, the local computer 36 connects to the computer network 38 over a telephone line 40 with a modem 42. Other physical connections to the computer network alternatively can be used, such as an ISDN, T1, DSL or other high speed telecommunications connections and appropriate connection device, a television cable and modem, a satellite link, an optical fiber link, an Ethernet or other local area network technology wire and adapter card, radio or optical transmission devices, etc. The invention can alternatively be embodied in a browsing environment for other public or private computer networks, such as a computer network of a commercial on-line service or an internal corporate local area network (LAN), an intranet, or like computer network.

Documents for browsing with the illustrated browser can reside as files of a file system stored in the computer's secondary storage 32 (FIG. 1), or reside as resources at a remote computer 44 (also referred to as a "site" or "store") connected to the computer network 38, such as a World Wide Web site on the Internet. The illustrated document 46 residing at the site or store 44 conforms with HTML standards, and may include extensions and enhancements of HTML standards. However, the illustrated browser also can browse documents having other data formats (e.g., Virtual Reality Modeling Language (VMRL), MICROSOFT WORD documents, etc.) from the local computer 36 or remote computer 44. In conformance with HTML, the illustrated document 46 can incorporate other additional information content 48, such as images, audio, video, executable programs, etc. which also reside at the remote computer 44 or other remote computers. The document 46 and information 48 preferably are stored as files in a file system of the remote computer 44. The document 46 incorporates the information 48 using HTML tags and Uniform Resource Locators (URLs) that specify the location of files or other Internet resources containing the images on the computer network 38. However, other locating formats can also be used.

When used for browsing documents, the illustrated browser displays the document in a window 50 or area of the local computer's 36 display 20 allocated to the browser by the operating system. The illustrated window 50 comprises a document display area 52 and user interface controls 54. The browser displays the document within the document display area 52 of the window 50. However, other display types could also be used. The computers 36, 44 can also be network computers (NCs) which include only selected components of computer system 10.

The browser and other client applications within the local computer 34 preferably work with documents (which have data formats other than those native to the browser or client application) by encapsulating the document's data into an associated object, and integrating with the object using pre-defined interfaces as described more fully below. This allows full use of all the features described below.

Alternatively, the browser or other client application can work with a document by launching an application program associated with the document and causing the associated application program to load the document and perform a specified operation on the document. In the MICROSOFT WINDOWS 95 operating system, this is done by looking up the application program associated with the document's file name extension in the system registry, (e.g., ".doc" for MICROSOFT WORD documents, ".vsd" for Shapeware's VISIO drawings, etc.) and a text string command for directing the program to perform a desired operation. The application program associated with a document also may be identified in the MICROSOFT WINDOWS operating system by matching a bit pattern at a specific offset into the file as also specified in the system registry. The browser or other client application patches the document's file name into the text string command and invokes the operating system's shell execute service to execute the command. Shell execute is a well known MICROSOFT WINDOWS operating system service which issues a text string as a command to the operating system's command interpreter (i.e., the "command.com" program in the MICROSOFT WINDOWS operating system).

The text string generally is in the form of an MS-DOS command, which specifies a path and file name of the associated application program's executable file, a flag for specifying the desired operation, and the document's path and file name. The command interpreter responds by parsing the text string, loading the application program specified in the text string, and passing the flag and the document's path and file name as command line arguments into the application program. The application program then "opens" (i.e., loads) the document and performs the operation specified by the flag.

Figure 3:
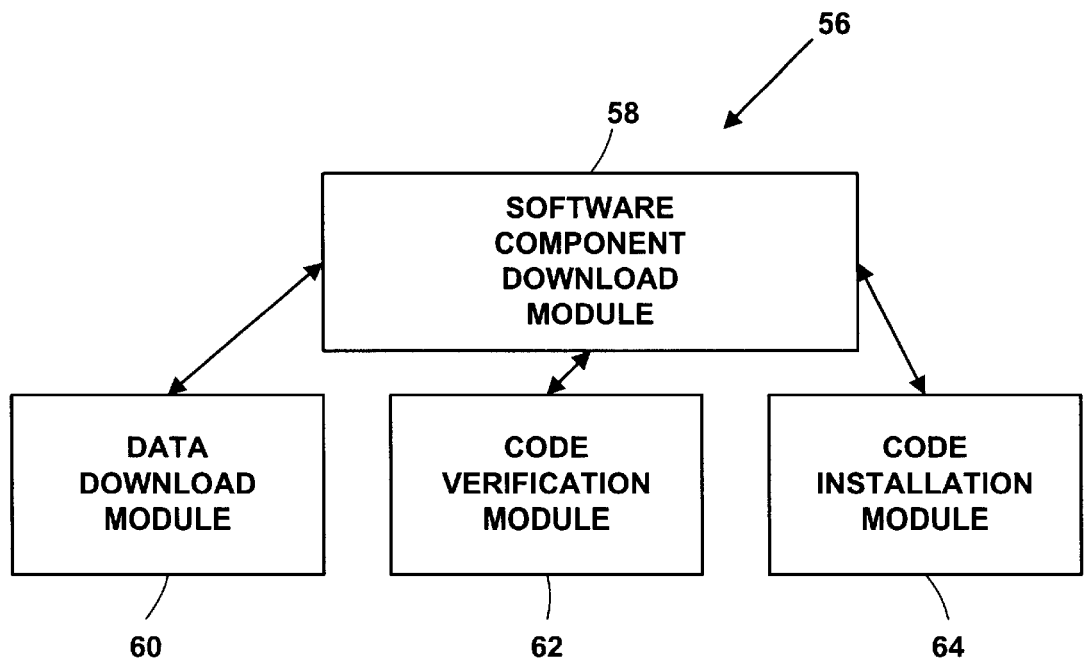
FIG. 3 is a block diagram illustrating a system for the present invention.

As was described above, it is desirable to add interactive or dynamic behavior to a document 46 written in HTML and other formats by obtaining software components from one or more remote computers. As is shown in FIG. 3, an illustrative embodiment of the present invention includes an automatic software download system 56 with a software component download module 58, a data download module 60, a code verification module 62, and a code installation module 64.

When a request is made to download a desired software component stored on a remote computer 44, the software component download module 58 determines if the desired software component is already installed on the local computer 36. If the desired software component is already installed on the local computer 36, then the desired software component on the local computer 34 is checked to see if a more recent version is available. If a more recent version of the desired software component is available, or if the desired computer software component is not available on the local computer 34, then it is downloaded in an asynchronous manner by the data download module 60. The software component download module 58 uses a Uniform Resource Locator (URL) or a network search path to locate a desired software component. The URL and network search path will be explained below.

Any software components downloaded to the local computer 36 are verified with the code verification module 62. The code verification module 62 checks a digital signature in a digital certificate included in the downloaded software component to ensure the downloaded software component is safe (e.g., computer virus and corruption free) on the local computer 34. The digital certificate is used to inform a user who created the software component and signed it with the digital signature. After it is verified by the code verification module 62, the downloaded computer software component is installed on the local computer 34 by the code installation module 64.

In an illustrative embodiment of the present invention, system 56 includes a software interface CoGetClassObjectFromUrl for the software component download module 58, a software interface URL Moniker for the data download module 60, a software interface Win VerifyTrust for the code verification module 62, and a software interface ICodeInstall for the code installation module 64.

In an illustrative embodiment of the present invention, the software interfaces and corresponding software subroutines just described are available in the Internet Component Download Application Program Interface (API) for the MICROSOFT WINDOWS 95 Operation System by Microsoft Corporation of Redmond, Wash. The details of each of these interfaces will be explained below. However, the modules of system 56 may also be implemented as hardware modules, or a combination of software and hardware modules. In addition, other software subroutines, interfaces, and operating systems could also be used for system 56.

Figure 4:
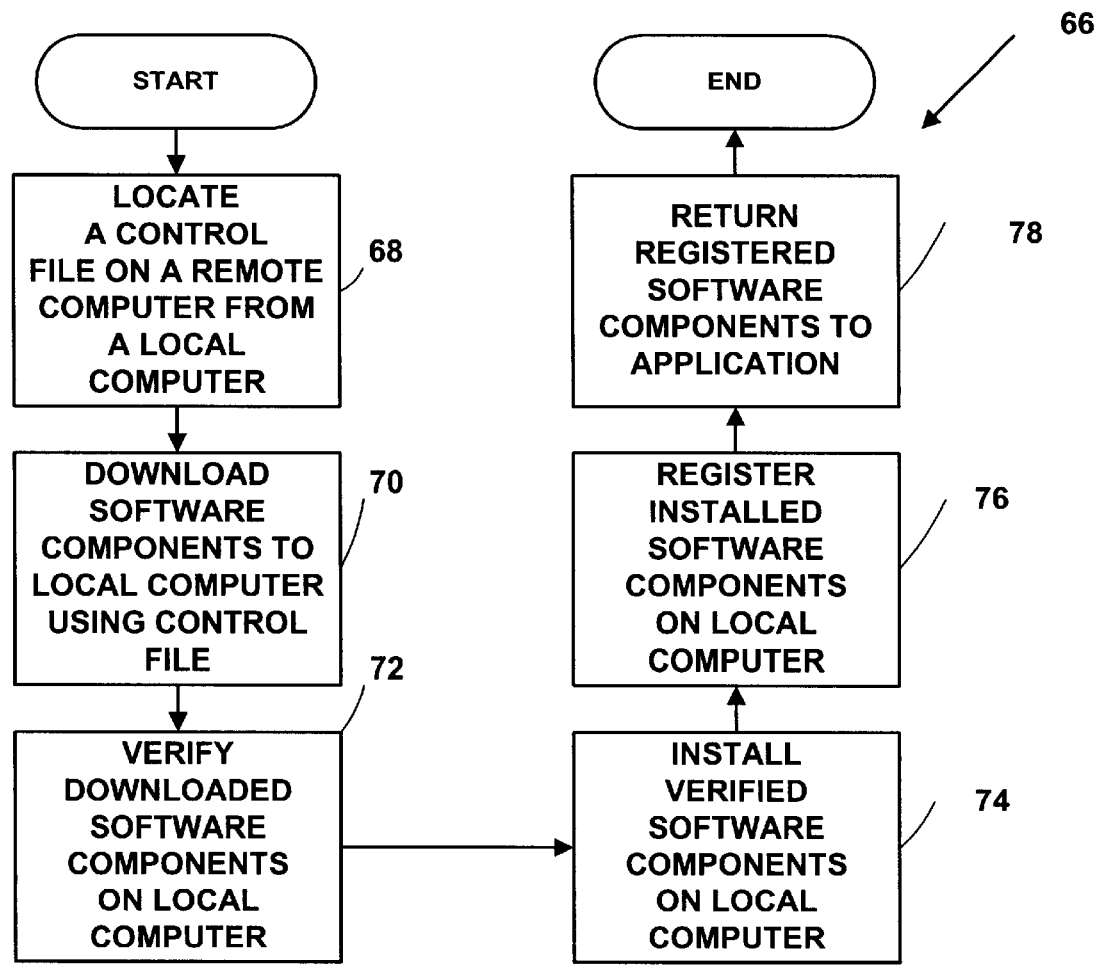
FIG. 4 is a flow diagram illustrating a code downloading method for the present invention.

The system 56 is used with method 66 as is shown in FIG. 4 for automatically locating 68, downloading 70, verifying 72, installing 74, registering 76, and returning 78 computer software components obtained from a computer network 36 like the Internet. However, method 66 and system 56 are not limited to downloading software components for HTML documents. Almost any type of computer software components can be obtained from a local or remote computer using system 56 and method 66 for many types of files or documents.

In an illustrative embodiment of the present invention, computer software components (e.g., a control file) are automatically located 68 using one of two designators: a URL or a network search path. The URL or network search path are used to first locate 68 a control file on a remote computer. The control file can be a single portable executable file or a file (e.g., a cabinet or initialization file) which contains one or more remote executable files, library files (e.g., Dynamic Link Library (.DLL) files), or references to one or more remote executable files or library files. The control file is used to determine the location of the software components on one or more remote computers 44 to download to the local computer 36.

In an illustrative embodiment of the present invention, the control file is used to locate object oriented software components including: Object Linking and Embedding (OLE) components, ACTIVEX (network activation) components, VISUAL BASIC components, NETSCAPE ONE Plug-ins, JAVA components or others to provide dynamic or interactive multimedia to a user. Moreover, software components can be downloaded to provide functionality other than dynamic or interactive multimedia and the components need not be in the form of object-oriented software components.

Downloaded software components are automatically verified 72 by checking a digital signature and a digital certificate contained within the software components (e.g., with Win Verify Trust ). However, security measures other than digital signatures and digital certificates could also be used to verify a software component. In another embodiment of the present invention, the software verification step 72 is optional. For example, on a corporate intranet, where all software components behind a corporate firewall are automatically trusted and need no verification. The verified software components are then automatically installed 74 (e.g., with ICodeInstall) in various directories of a file system on the local computer 34. After installation the software components are registered 76 (e.g., with DllRegisterServer or Module Usage) in a registry database on the local computer 34. The registry database is used to keep track of which software components are installed on the local computer 34. In another embodiment of the present invention, the registration step 76 is optional. After registration, selected software components are returned 78 to a requesting application. Further details of method 66 will be explained below.

In an illustrative embodiment of the present invention, a network browser such as the MICROSOFT INTERNET EXPLORER version 3.0, uses system 56 and method 66 to download and install object oriented software components used for dynamic or interactive multimedia in HTML documents 46. However, other applications can use system 56 and method 66 to download and install executable software components from one or more remote computers.

To use dynamic or interactive multimedia in HTML documents, HTML <OBJECT> tags are used. One or more HTML <OBJECT> tags are embedded into a document written in HTML or some other programming or scripting language which permits HTML references. The <OBJECT> tags typically point to object-oriented computer software components or some other file format that is executable or references an executable file.

The HTML <OBJECT> tag has multiple attributes including: DATA, CODEBASE, CLASSID, TYPE, ID, and CLASS attributes. The DATA attribute specifies a Uniform Resource Locator (URL) referencing an object's data. The CODEBASE attribute is an optional attribute used when the object references a desired software component program. Besides the actual location of the desired software component, the "CODEBASE" URL in the <OBJECT> tag may also include an optional version number using the following syntax:

"CODEBASE=http://www.foo.com/bar.ocx#Version=a, b,c,d".

Where "a,b" in "#Version=a,b,c,d" represent the desired version of a software component on a remote server, and "c,d" represent the desired version of a local software component. The method 66 will download 70 and process (72–78) the software component pointed to by the CODEBASE attribute only if the specified version number of the remote software component is more recent than any existing version of the same software component currently installed on the local computer 34. If a version number is not specified for a software component, it is assumed that any version installed on the local computer 34 is proper to use. The CODEBASE attribute can also be a URL fragment with the syntax:

"CODEBASE=#Version=−1, −1, −1, −1".

Specifying only "#Version=−1, −1, −1, −1" for the CODEBASE attribute causes a network search path to be used to find the latest version of a desired software component. The network search path will be explained below.

The CLASSID attribute is used to specify an object identifier. On each computer (36,44) connected to the computer network 38, for example, the operating system registry (also called the registration database) is used to store relevant information about object oriented components according to their CLaSs IDentifier (CLSID). An object registers its CLSID in the operating system registry database to enable client applications (e.g., a network browser) to locate and load the executable code associated with the objects. The HTML <OBJECT> CLASSID is equivalent to the object-oriented CLSID.

The CLSIDs are also given the alias "GUID," which stands for Globally Unique IDentifiers. Each object class is represented by a CLSID, a 128-bit (16-byte) number that is assumed to be unique on a computer network across space and time. A CLSID is a 16-byte value with a specific structural definition that has an ASCII representation shown below as a group of hexadecimal digits within braces such as "{42754850-16b7-11ce-90eb-00aa003d7352}" (The groupings of the hex digits and the hyphens are part of the ASCII representation as well). Application programs such as the network browser manipulate the structural definition (e.g., the C/C++ structural definition) of the CLSID. The CLSID is used as the HTML <OBJECT> CLASSID.

The TYPE attribute specifies the Internet media type for the OBJECT data. The ID attribute is used to define a document-wide identifier. The CLASS attribute is used for applying a pre-determined style to an OBJECT element. Remaining <OBJECT> tag attributes, like "ID, STYLE, DIR, ALIGN, WIDTH, HEIGHT, BORDER, HSPACE and USPACE" are known attributes in HTML and, although previously used in a manner different from the present invention, are generally described in HTML 3: Electronic Publishing on the World Wide Web by Dave Ragget, Jenny Lam, and Ian Alexander, Addison-Wesley, 1996.

An example <OBJECT> tag in a HTML document for an ACTIVEX Control is shown below.

<OBJECT
  CLASSID="classid:663CFEE:1A9B-22DC-AB3C-080036F 12502"
  CODEBASE="http://www.microsoft.com/test.ocx#FileVersion=0,0,4,2"
>
</OBJECT> where the CLASSID "663CFEE:1A9B-22DC-AB3C-080036F12502" shows an object identifier (i.e., CLSID) for the ACTIVEX Control "test.ocx", the CODEBASE attribute gives the URL "http://www.msn.com/test.ocx" which specifies where to find the ACTIVEX Control file. </OBJECT> signifies the end of the <OBJECT> tag. If the ACTIVEX Control is not present on the local computer, or if the ACTIVEX Control is already stored on the local computer and has a version earlier than 4.2, then it will be downloaded to the local computer which will replace the current version on the local computer.

After embedding one or more HTML <OBJECT> tags in a document written in HTML and storing the document on a remote computer 44 connected to a computer network 38 (e.g., the Internet, an intranet) the document 46 is browsed with a network browser from the local computer 34.

When an HTML <OBJECT> tag is encountered in the document by the network browser, the <OBJECT> tag is parsed to pull out <OBJECT> tag attributes (e.g., the CLASSID, CODEBASE, etc.). The network browser passes the <OBJECT> tag attributes to the software component download module 58 via the CoGetClassObjectFromURL interface. If a network browser is not used, other applications could use method 66 and system 56 by sending the proper parameters to the CoGetClassObjectFromURL interface.

In an illustrative embodiment of the present invention, the single interface CoGetClassObjectFromURL manages method 66 and system 56. However, multiple interfaces could also be used. Any application that wishes to download almost any software component from a remote computer 44 connected to a computer network 38 like the Internet can do so by passing the appropriate parameters to the CoGetClassObjectFromURL interface.

The interface to the CoGetClassObjectFromURL interface is shown below. STDAPI CoGetClassObjectFromURL
(
  [in] REFCLSID rclsid,
  [in] LPCWSTR szCodeURL,
  [in] DWORD dwFileVersionMS,
  [in] DWORD dwFileVersionLS,
  [in] LPCWSTR SzContentType,
  [in] LPBINDCTX pBindCtx,
  [in] DWORD dwClsContext,
  [in] LPVOID pvReserved,
  [in] REFIID riid,
  [out] VOID **ppv);

Where [in] are input parameters and [out] are output parameters. CoGetClassObjectFromURL accepts the following arguments:

| Argument | Type | Description |
| --- | --- | --- |
| rclsid | REFCLSID | CLSID of the object that needs to be installed. If value is CLSID_NULL, then szContentType is used to determine the CLSID. |
| szCodeURL | LPCWSTR | URL pointing to the code for the object. This may point to an executable, to an .INF file, or to a .CAB file. If this value is NULL, then Internet Component Download will still attempt to download the desired code from an object store server on a Internet Search Path. |
| dwFileVersionMS | DWORD | Major version number for the object that needs to be installed. If this value and the next are both 0xFFFFFFFF, then it is assumed that the latest version of the code is always desired, an attempt to download new code will be made. |
| dwFileVersionLS | DWORD | Minor version number for the object that needs to be installed. If this value and the previous one are both 0xFFFFFFFF, then it is assumed that the latest version of the code is always desired, an attempt to download new code will be made. |
| szContentType | LPCWSTR | MIME type that needs to be understood by the installed object. If rclsid is CLSID_NULL, this string is used to determine the CLSID of the object that must be installed. Note: this parameter is only useful when trying to download a viewer for a particular media type, if the MIME type of the media is known but the CLSID is not. |
| pBindCtx | LPBINDCTX | A bind context to use for downloading/installing component code. The client should register its IBindStatusCallback in this bind context to receive callbacks during the download and installation process. |

-continued

| Argument | Type | Description |
| --- | --- | --- |
| dwClsContext | DWORD | Values taken from the CLSCTX enumeration specifying the execution context for the class object. |
| pvReserved | LPVOID | Reserved value, must be set to NULL. |
| riid | RBFIID | The interface to obtain on the factory object (typically IClassFactory). |
| ppv | VOID** | Pointer in which to store the interface pointer upon return if the call is synchronous. |
| Returns | S_OK | Success. ppv contains the requested interface pointer. |
|  | MK_S_ASYNCHRONOUS | Component code will be downloaded and installed asynchronously. The client will receive notifications through the IBindStatusCallback interface it has registered on pBindCtx. |
|  | E_NOINTERFACE | The desired interface pointer is not available. Other CoGetClassObject error return values are also possible here. |

In an illustrative embodiment of the present invention, the values for parameters passed to the CoGetClassObjectFromURL interface are read directly from an HTML <OBJECT> tag. For example, the szCodeURL, dwFileVersionMS, and dwFileVersionLS are specified inside an <OBJECT> tag with "CODEBASE=http://www.foo.com/bar.ocx#Version=a,b,c,d" where szCodeURL is "http://www.foo.com/bar.ocx", dwFile VersionMS is "a,b", the major version of a file on a remote server (e.g., a software provider such as Microsoft), and dwFileVersionLS is "c,d", the version of a file on the local computer. The CoGetClassObjectFromURL interface is responsible for managing method 66 and system 56. A software component requested with method 66 is typically a factory class object. A class factory generates actual object class instances of an object and is known to those skilled in the art.

Figure 5:
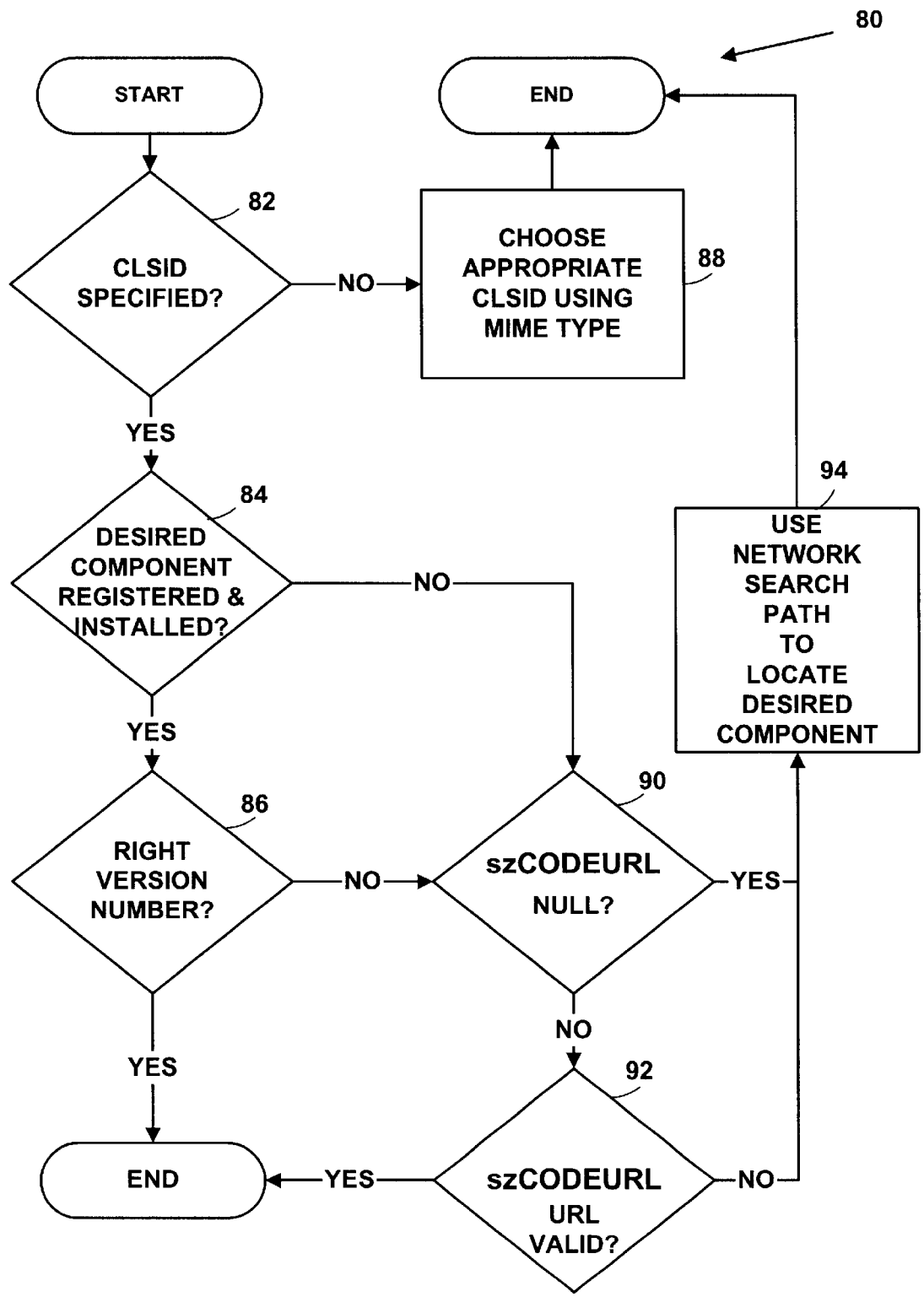
FIG. 5 is a flow diagram illustrating a code locating method for the present invention.

As is shown in FIG. 5, the CoGetClassObjectFromURL interface uses method 80 to locate a control file on a remote computer 44. If it specifies 82 a CLSID, CoGetClassObjectFromURL checks to see if the desired software component (i.e., the control file) is registered and installed 84 on the local computer 36 with the right version number 86. If it does not specify a CLSID (i.e., has a value of CLSID_NULL), CoGetClassObjectFromURL will choose the appropriate CLSID by interpreting the Multipurpose Internet Mail Extension (MIME) 88 type specified in the szContentType parameter. MIME provides a standard mechanism for messages to be exchanged over computers connected to the Internet. See *Internet Standard Document: RFC* 1521 for specific details on MIME.

If the desired software component is registered and installed on the local computer, and if the version number is correct, then the desired software component is obtained from the local computer 36. If the desired software component is not registered and installed on the local computer, or if the version number is incorrect, then he desired software component is obtained from the remote computer 44.

To obtain the desired software component from the remote computer 44, the szCodeURL parameter is checked 90. If the szCodeURL parameter is not NULL, then an attempt is made to locate the desired software component with the URL stored in szCodeURL. If the URL is valid 92, the desired software component will be downloaded 70 (FIG. 4) to the local computer 36. If the szCodeURL is NULL, or the specified URL is invalid, then a network search path is used to locate the software component 94. The network search path is specified as shown below.

CodeBaseSearchPath=<URL$_1$>; <URL$_2$>; . . . <URL$_m$>; CODEBASE URL; <URL$_{m+1}$>; . . . <URL$_{n-1}$>; <URL$_n$>

This search path is made accessible to the CoGetClassObjectFromURL interface. For example, using MICROSOFT INTERNET EXPLORER 3.0 running on the MICROSOFT WINDOWS 95 operating system, the search path is stored in the system registry. On other operating systems or with other software applications, this search path may be stored elsewhere as long as it is accessible to the CoGetClassObjectFromURL interface. On MICROSOFT WINDOWS operating systems, the network search path is specified in a string in the registry database under they key:

HKEY_LOCAL_MACHINE\Software\Microsoft\Windows\CurrentVersion\Internet Settings\CodeBase SearchPath However, other registry database keys could also be used. the value for this key is a string of sz/CodeURL parameters.

Each of URLs URL$_1$ through URL$_n$ in the network search path are absolute URLs pointing to HTTP servers acting as "Object Stores" 44. However, other formats could also be used for the network search string.

Figure 6:
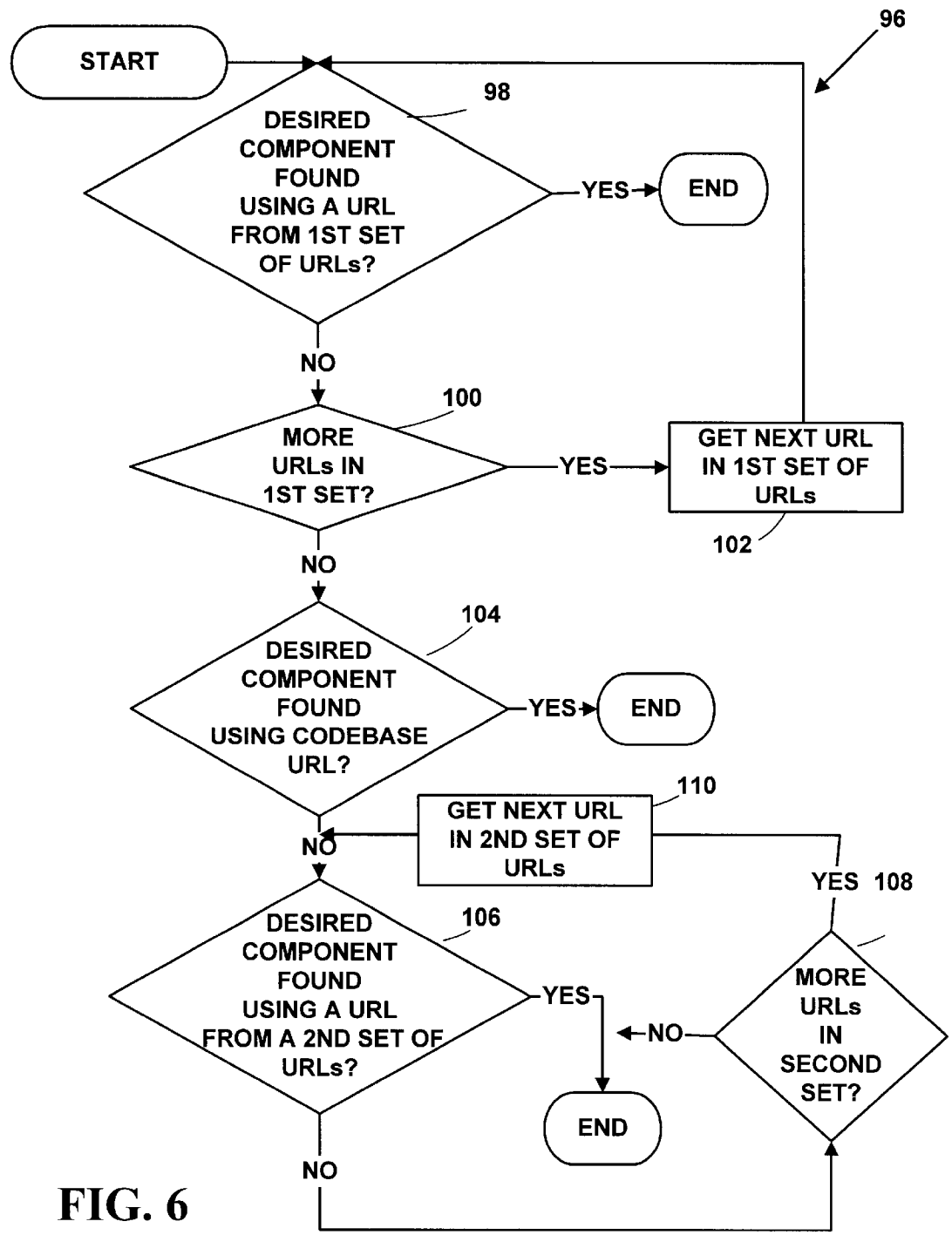
FIG. 6 is a flow diagram illustrating a network search method for the present invention.

As is shown in FIG. 6, the CoGetClassObjectFromURL interface using method 96 will first try locating 68 (FIG. 4) the desired control file using URL$_1$ through URL$_m$ (98–102). If the desired control file cannot be located using URL$_1$ through URL$_m$, CoGetClassObjectFromURL will try the location specified in the szCodeURL parameter (e.g., corresponding to the CODEBASE attribute in the <OBJECT> tag) 104. If the desired control file cannot be located using the szCodeURL search path, CoGetClassObjectFromURL will try the locations specified in locations URL$_{m+1}$ through URLN (106–110). If this search fails, then the desired control file cannot be located. The network search using a network search path will use the first successful response from a server and will not subsequently continue searching for newer versions of components. However, newer versions of software components can also be searched for.

If the CODEBASE keyword is not included in the CodeBaseSearchPath key, then calls to CoGetClassObjectFromURL will not check the szCodeURL location for downloading code. By removing the CODEBASE keyword from the CodeBaseSearchPath, corporate intranet administrators can effectively disable corporate users from accessing any remote computer to obtain a computer software component specified by a HTML <OBJECT> tag. This also allows registration of default Object Store locations 44 on the World Wide Web, where browsers can find code when no CODEBASE location is explicitly specified. In addition, by removing the CODEBASE keyword from the CodeBaseSearchPath and pointing $URL_1$ through $URL_n$ to intranet sites, corporate intranet administrators can effectively disable corporate users from accessing software components from any computers outside a local intranet.

In an alternative embodiment of the present invention, the network search path can be used in an alternative way: the URLs in the network search path (98–102, 106–110) will be searched for a control file after trying the location specified in the szCodeURL parameter for CoGetClassObjectFromURL, (e.g., after trying the location specified in the CODEBASE attribute 104 from a HTML <OBJECT> tag).

In an illustrative embodiment of the present invention, an Object Store on the network search path is an HTTP server that services requests for a desired control file. CoGetClassObjectFromURL will try to locate the control file from the various Object Stores in the search path. Specifically, an Object Store will receive an HTTP POST request with data in the format below:

CLSID={class id}
Version=a,b,c,d
MIMETYPE=mimetype

All the values above are optional, although at least one of CLSID or MIMETYPE parameters must be present. The Object Store parses this information, checks an internal database, and either fails, or redirects the HTTP request to the control file on the next remote computer in the network search path.

The HTTP POST parameters are processed by the Object Store as follows: If CLSID is provided with no version number, then the most recent object matching the CLSID will be returned. If the CLSID is provided with Version, then the object matching the CLSID and with the highest version number greater than or equal to Version will be provided. If no object is available that matches the CLSID with a large enough version number, then the HTTP error (e.g., the 404 error) will be returned. MIMETYPE will be ignored when CLSID is provided.

If no CLSID is provided, but MIMETYPE is provided, then the first object found in the database that matches the MIMETYPE will be returned. Version, if provided, is treated as described above. If neither CLSID or MIMETYPE is provided then the HTTP error return code "400 Bad Request" will be returned.

In addition to the HTTP POST data described above, queries to Object Stores may also include HTTP headers for ACCEPT (MIME type) and ACCEPT-LANGUAGE, thus specifying the desired platforms and language-localized implementation for a component. HTTP headers are typically added to all HTTP requests made by method 66 and system 56. This allows Object Stores to serve different code implementations for differing platforms or even different languages.

The illustrated and alternative embodiments of the present invention described above assume that all computer software storage servers searched with the network search path are active HTTP servers capable of handling HTTP POST requests and querying an object database to find the desired software components. In another alternative embodiment of the present invention, non-HTTP servers can also be used in the network search path (e.g., FTP servers and standard file servers).

The control file located 68 on a remote computer can be, for example, a portable executable file, a cabinet file, or an initialization file. A portable executable (PE) is a single executable file that is downloaded, verified, registered and installed on the user computer according to method 66. The portable executable is typically an OLE control or ACTIVEX (network activation) control file (e.g., .OCX), a Dynamic Link Library file (e.g., .DLL), or a executable file (.EXE). OLE control, ACTIVEX, Dynamic Link Library, and executable files are known to those skilled in the art.

A single portable executable file is the simplest way to package a software component to provide dynamic or interactive multimedia. However, when a single portable executable is used, the file is typically not compressed, and the software component will not be platform independent unless an HTTP server negotiates a platform independent format. The HTTP server negotiation will be explained in detail below.

A cabinet file (e.g., CAB) can be used for the control file. The cabinet file contains one or more files, all of which are downloaded together in a compressed "cabinet." One file in the cabinet is an initialization file (e.g., .INF) providing further installation information. This .INF file may refer to files in the cabinet as well as to files at other URLs. Using a cabinet file requires authoring of a .INF and packaging of a .CAB file, but in return it provides file compression. File compression is completed with Lempel-Ziv compression, which is known in the art. However, other compression formats could also be used.

Cabinet files can be created with the DIANTZ.EXE tool by Microsoft Corporation. However, other cabinet file creation tools can also be used. The DIANTZ.EXE tool takes a directive file (e.g., .DDF), which specifies how to create a cabinet file, and creates a cabinet file. The DIANTZ.EXE is used with the following command line:

DIANTZ.EXE/f directive_file.ddf where the "/f" attribute tells the DIANTZ.EXE tool to use the file "directive_file.ddf" to create the cabinet file. An example directive file, CIRC3.DDF is shown below.

;DIAMOND directive file for CIRC3.OCX+CIRC3.INF
.OPTION EXPLICIT ;Generate errors on variable typos
Set CabinetNameTemplate=CIRC3Z.CAB
;** The files specified below are stored, compressed, in cabinet files
.Set Cabinet=on
.Set Compress=on
circ3.INF
circ3.OCX The example directive file shown above would be used to create a cabinet file (e.g., ".Set Cabinet=on") containing two compressed (e.g., ".Set Compress=on") files: circ3.INF and circ3.OCX where "circ3.INF" is the single initialization file and "circ3.OCX" is the desired software component for dynamic or interactive multimedia. The .OCX file extension signifies an OLE control or ACTIVEX (network activation control) file. Comments are designated with a semi-colon ";". As was discussed above for the portable executable, the cabinet file will also not be platform independent, except with HTTP server negotiation which will be explained below.

A stand-alone initialization file (.INF) can also be used for the control file. This file specifies various files that need to be downloaded and setup. The syntax of the .INF file allows URLs pointing to files to download, and provides platform independence by enumerating choices for various platforms. An example initialization file is shown below.

;Sample INF file for CIRC3.OCX
[Add.Code]
circ3.ocx=circ3.ocx
random.dll=random.dll
mfc40.dll=mfc40.dll
foo.ocx=foo.ocx
[circ3.ocx]
;lines below specify that the specified circ3.ocx (clsid, version) needs to be installed on
;the system. If doesn't exist already, can be downloaded from the given location (a .CAB)
;note: if "thiscab" is specified instead of the file location, it is assumed that the
;desired file is present in the same .CAB cabinet that the INF originated from
;otherwise, if the location pointed to is a different .CAB, the new cabinet is also downloaded and
;unpacked in order to extract the desired file
file=http://ww.code.com/circ3/circ3.cab clsid={9DBAFCCF-592F-101B-85CE-00608CEC297B}
FileVersion=0,0,1,2
[random.dll]
;lines below specify that the random.dll needs to be installed in the system
;if this doesn't exist already, it can be downloaded from the given location.
file=http:// www.code.com/circ3/random.dll
;Note that the FileVersion is option, and it may also be left empty, meaning that any version is ok.
FileVersion=
DestDir=10
;DestDir can be set to 10 or 11 (LDID_WIN or LDID_SYS by INF convention)
;this places files in \windows or \windows\system, respectively
;if no dest dir specified (typical case), code is installed in the fixed occache directory.
[mfc40.dll]
;leaving the file location empty specifies that the installation
;needs mfc40 (version 4,0,0,5), but it should not be downloaded.
;if this file is not already present on the client machine, component download fails
file=
FileVersion=4,0,0,5
[foo.ocx]
;leaving the file location empty specifies that the installation
;needs the specified foo.ocx (clsid, version), but it should not be downloaded.
;if this file is not already present on the client machine, component download fails
file=
clsid={DEADBEEF-592F-101B-85CE-00608CEC297B}
FileVersion=1,0,0,143

The sample .INF file shown above can be used to install the files "circ3.ocx, random.dll, mfc40.dll, and foo.ocx" where the .OCX file extension signifies an OLE control or ACTIVEX control (network activation) file and the .DLL file extension signifies a Dynamic Link Library file. OLE controls, ACTIVEX controls and Dynamic Link Library files are known to those skilled in the art.

The .INF file has instructions to install each of the necessary files, and comments are again designated with a semi-colon ";". For example, the .INF file specifies that the "circ3.ocx" file needs to be installed on the local computer with a "clsid={9DBAFCCF-592F-101B-85CE-00608CEC297B}." "FileVersion=0,0,1,2" is used to check a local version of a file to see if it is earlier than Version 1.2. If it is, it will be downloaded to the local computer. The "circ3.ocx" can be downloaded from a remote computer in a cabinet file using the URL "file=http://www.code.com/circ3/circ3.cab." The "FileVersion=" attribute for the "random.dll" file is empty, so that any version of this file is ok. The "file=" attribute is empty for "mfc40.dll" and "foo.ocx" which signifies that these files should not be downloaded to the local computer. If these files don't exist on the local computer, then the downloading fails.

The initialization file also provides platform independence for HTTP and non-HTTP servers which store the desired software components. It is possible to create platform-independent setup scripts that pull desired software components from different locations depending on the desired platform. A sample platform-independent .INF file would include a text such as the following:

[circ3.ocx]
;lines below specify that the specified circ3.ocx (clsid, version) needs to be installed on
;the system. If doesn't exist already, can be downloaded from the given location (a CAB)
file-win32-x86=file://products/release/circ3/x86/circ3.cab
file-win32-mips=file://products/release/circ3/mips/circ3.cab
file-mac-ppc=ignore
;the 'ignore' keyword means that this file is not needed for this platform clsid={9DBAFCCF-592F-101B-85CE-00608CEC297B}
FileVersion=1,2,0,0

The "file-x-y" syntax used in the .INF file is expanded to "file-%opersys%-%cpu%", (e.g., "file-win32-mips" where %opersys%="win32" and %cpu%="mips") allowing the .INF file to specify multiple locations where various platform-dependent modules can be found and downloaded. Valid values for %opersys% and %cpu% attributes are explained below.

The following MIME types will be used to describe PEs (portable executables—.EXE, .DLL, .OCX), cabinet files (.CAB), and setup scripts (.INF):

| File description | MIME Type |
| --- | --- |
| PE (portable executable) - .EXE, .DLL, .OCX | application/x-pe-%opersys%-%cpu% |
| Cabinet files - .CAB | application/x-cabinet-%opersys%-%cpu% |
| Setup scripts - .INF (platform independent) | application/x-setupscript |

The %opersys% and %cpu% attribute values shown below will specify the operating system and CPU for the desired platform desired software components will be executed on. For example, the MIME type for a Win32 cabinet file running on an INTEL x86-architecture processor (whether manufactured by Intel Corporation or another company) would be application/x-cabinet-win32-x86.

The following are valid values for %opersys% and %cpu%:

| Valid values for %opersys% | Meaning |
| --- | --- |
| win32 | 32-bit MICROSOFT WINDOWS operating systems (MICROSOFT WINDOWS 95 or MICROSOFT WINDOWS NT) |
| mac | APPLE MACINTOSH operating system |
| <other> | will be defined as necessary |
| Valid values for %cpu% | Meaning |
| x86 | INTEL x86 family of processors |
| ppc | MOTOROLA POWERPC architecture |// -continued
| mips | MIPS architecture processors |
| alpha | DEC Alpha architecture |

However, more or fewer values could also be used.

When the desired software component is on a non-HTTP server (e.g., at an intranet or local LAN location), a .INF file can be used to achieve platform independence by specifying different URLs for files to be downloaded for different platforms.

Platform independence for HTTP servers that store the desired software components is also provided without using an initialization file. An HTTP ACCEPT header MIME request type is used to provide platform independence. The MIME request type specifies which platform the code is to run on, thus allowing platform independence when the CODEBASE attribute or the network search path is used.

After locating 68 (FIG. 4) a desired information file, the necessary software components are downloaded 70 (FIG. 4) with a data download module 60 (FIG. 3). The CoGetClassObjectFromURL interface uses the URL moniker interface to download 70 the necessary software components asynchronously from one or more remote computers 44. However, other interfaces could also be used to download the necessary software components. The URL moniker interface is described in greater detail in URLMON.DOC and ASYNCMON.DOC in the ACTIVEX *Software Development Kit* (SDK) by Microsoft.

The URL moniker interface uses the IBindStaiusCallback interface, which is implemented in an application program like the network browser, to pass status information back to the application program. The IBindStatusCallback interface enables the browser to tell the user when the download 70, verification 72, registration 74, and installation 76 steps are complete.

The client of the CoGetClassObjectFromURL interface (e.g., the network browser) will receive notification about the download/install process via the provided IBindStatusCallback interface. During the download process, the following additional values (from the BINDSTATUS enumeration of MICROSOFT WINDOWS 95, for example) may be passed back as the ulStatusCode parameter for IBindStatusCallback:: OnProgress.

| Value | Description |
| --- | --- |
| BINDSTATUS_BEGINDOWNLOADCOMPONENTS | The download operation has begun downloading code for software components that will be installed before the object may be instantiated. The szStatusText accompanying IBindStatusCallback::OnProgress provides the display name of the component being downloaded. |
| BINDSTATUS_INSTALLINGCOMPONENTS | The download operation has downloaded code and is installing it. The szStatusText accompanying IBindStatusCallback::OnProgress provides the display name of the component being installed. |
| BINDSTATUS_ENDDOWNLOADCOMPONENTS | The download operation has finished downloading and installing all necessary code. The szStatusText accompanying IBindStatusCallbackOnProgress provides the display name of the newly installed component. |

Since the downloading 70 of software components occurs asynchronously, the CoGetClassObjectFromURL interface will often return immediately with a return value of E_PENDING. At this point, the IBindStatusCallBack mechanism is used to communicate the status of the download operation to the client (e.g., the network browser). To participate in this communication, the client implements IBindStatusCallback and registers this interface in pBindCtx passed into CoGetClassObjectFromURL using RegisterBindStatusCallback. The client can expect to be called with callback notifications for OnStartBinding (providing an IBinding for controlling the download), OnProgress (reporting progress), OnObjectAvailable (which returns the desired object interface pointer), and OnStopBinding (which returns error codes in case of an error). For further negotiations, the client also implements ICodeInstall to install the desired software component as is described below. However, other downloading and callback processes can also be used.

After downloading 70 the necessary software components to the local computer 36, the software components are verified 72 with a code verification module 62. CoGetClassObjectFromURL uses the Win VerifyTrust interface and the ICodeInstall interface to ensure the necessary software components are safe and trusted, and to ensure that the user wants to install the software components. However, other interfaces could also be used to verify and install the necessary software components. ICodeInstall is implemented by the downloading client (e.g., the network browser), and is used whenever installation of software components needs some service (e.g., verification) before the download can be negotiated correctly.

A code install operation 74 requires additional services from the client in order to complete the negotiation necessary for a download operation 70. Such services are requested using IBindStatusCallback::QueryInterface. The specific interface requested in IBindStatusCallback::QueryInterface is ICodeInstall. This interface is implemented by a client application (e.g., a network browser). The ICodeInstall interface has two member functions: NeedVerficationUI and OnCodeinstallProblem. The ICodeInstall interface and functions are shown below.

```
interface ICodeInstall : IUnknown {
    HRESULT     NeedVeificationUI(
                [out] HWND* phwnd);
    HRESULT     OnCodeInstallProblem(
                [in] ULONG ulStatusCode,
                [in] LPCWSTR szDestination,
```

-continued

```
                [in] LPCWSTR szSource,
                [in] DWORD dwReserved);
};
```

ICodeInstall::NeedVerificationUI is called to display User Interface (UI) for verification of downloaded code. When a client is called with this function, it has the opportunity to clear a message queue of its parent window before allowing UI to be displayed. If the client does not wish to display UI, code verification may continue, but components may fail to be installed. The parameters for ICodeInstall::NeedVerificationUI are explained below.

HRESULT NeedVerificationUI([out] HWND* phwnd);

| Argument | Type | Description |
| --- | --- | --- |
| phwnd | HWND * | Client-provided HWND of the parent window for displaying code verification UI. If this parameter is NULL, the desktop window is used. If the value is INVALID_HANDLE_VALUE, or if the return value is S_FALSE, then no code verification UI will be displayed, and certain necessary components may not be installed. |
| Returns | S_OK | Success. |
|  | S_FALSE | No window is available. |
|  | E_INVALIDARG | The argument is invalid. |

ICodeInstall::OnCodeInstallProblem is called when there is a problem with code installation. This notification gives the client a chance to resolve the problem, often by displaying UI, or by aborting the code installation process. The parameters for ICodeInstall::OnCodeInstallProblem are explained below.

HRESULT OnCodeInstallProblem(
[in] ULONG ulStatusCode,
[in] LPCWSTR szDestination,
[in] LPCWSTR szSource,
[in] DWORD dwReserved);

| Argument | Type | Description |
| --- | --- | --- |
| ulStatusCode | ULONG | Status code describing what problem occurred. A member of CIP_STATUS. |
| szDestination | LPCWSTR | The name of the existing file that was causing a problem. This may be the name of an existing file that needs to be overwritten, the name of a directory causing access problems, or the name of a drive that is full. |
| szSource | LPCWSTR | Name of the new file to replace the existing file (if applicable). |
| dwReserved | DWORD | Reserved for future use. |
| Returns | S_OK | Continue the installation process. If there was an "access denied" or disk-full problem, retry the installation. If there was an existing file (newer or older version), overwrite it. |
|  | S_FALSE | Skip this particular file, but continue with the rest of the code installation process. Note: this is the typical response for the CIP_NEWER_VERSION_EXISTS case. |
|  | E_ABORT | Abort the code installation process. |
|  | E_INVALIDARG | The given arguments are invalid. |

The ulStatusCode parameter above is one of the following values:

| Value | Description |
| --- | --- |
| CIP_DRIVE_FULL | The drive specified in szDestination is full. |
| CIP_ACCESS_DENIED | Access to the file specified in szDestination is denied. The client is required to take a sequence of steps to possibly correct the situation. The client could check its own state to see if the file in question or the component it belongs to is in use by the client and close the file or release the component and call COM to free unused libraries in the process. If it cannot locate the file or component, it should display UI to the user suggesting that they close other applications in the system to retry the operation. The operation can be retried by returning S_OK. Returning S_FALSE will ignore this file and proceed with the rest of the installation. Any error returns will cause the code download to abort. |
| CIP_OLDER_VERSION_EXISTS | An existing file (older version) specified in szDestination needs to be overwritten by the file specified in szSource. |
| CIP_NEWER_VERSION_EXISTS | A file exists (specified in szDestination) that is a newer version of a file to be installed (specified in szSource) |
| CIP_NAME_CONFLICT | A file exists (specified in sZDestination) that has a naming conflict with a file to be installed (specified in szSource). The existing file is neither a newer nor an older version of the new file - they are mismatched but have the same file name. |
| CIP_TRUST_VERIFICATION_COMPONENT_MISSING | The code installation process cannot find the necessary component (e.g., WinVerifyTrust) for verifying trust in downloaded code. szSource specifies the name of the file that cannot be certified. The client should display UI asking the user whether or not to install the untrusted code, and should then return E_ABORT to abort the download, S_OK to continue anyway, or S_FALSE to skip this file but continue (usually dangerous). |
| CIP_NEED_REBOOT | The self-extracting EXE or 'hook' (either Win32 INF section or a custom setup program hook run using the run=<cmd-line>) in the hook section updated components in use that can only be used after a reboot. The client should display UI and Shutdown windows if the user agrees to reboot the machine for the changes to take effect. The INF filename or command line of the EXE that caused the reboot is in szDestination. Returning E_ABORT will abort the download. |
| CIP_EXE_SELF_REGISTERATION_TIMEOUT | The EXE that was spawned to self-register (may also be a self-extracting EXE) is still pending completion. This is usually called out when the client calls IBinding::Abort() while waiting for the self-extracting EXE to complete. The command line of the EXE is available in szDestination. The client should display UI to the user to warn that installation on the page is incomplete. The return value of S_OK from the callback will cause a continued wait for the EXE to complete. S_FALSE will abandon the EXE and proceed with the rest of the installation. Any error returns will cause abortion of the code download. |
| CIP_UNSAFE_TO_ABORT | Code download is in setup phase and one or more components may have already been installed irreversibly rendering unknown the state of the setup of the component in question. This notification is issued when the client calls IBinding::Abort() while in setup phase. The return value of S_OK will cause Abort() to return with S_FALSE and the code download will continue. Any other return will cause the code download to abort and the state of the component is not guaranteed. |

After the necessary software components are downloaded, the Win VeriftyTrust interface checks to see if the downloaded components possess a digital signature. However, other verification interfaces could also be used. If the downloaded software components posses a digital signature, the Win VeriftyTrust interface validates the digital signature and its corresponding digital certificate. The digital certificate describes who issued the software component and who created the digital signature. If the downloaded software components do not possess a digital signature, or if the corresponding signature was not issued by a trusted authority, Win VeriftyTrust gives the client-side (e.g., network browser) user the option of whether or not to trust the code and install it on the local computer 36. Before asking for verification on its own, Win Verify Trust uses ICodeInstall::NeedVerificationUI to confirm that it is appropriate to display the appropriate UI for the user of the local computer 34.

Figure 7A:
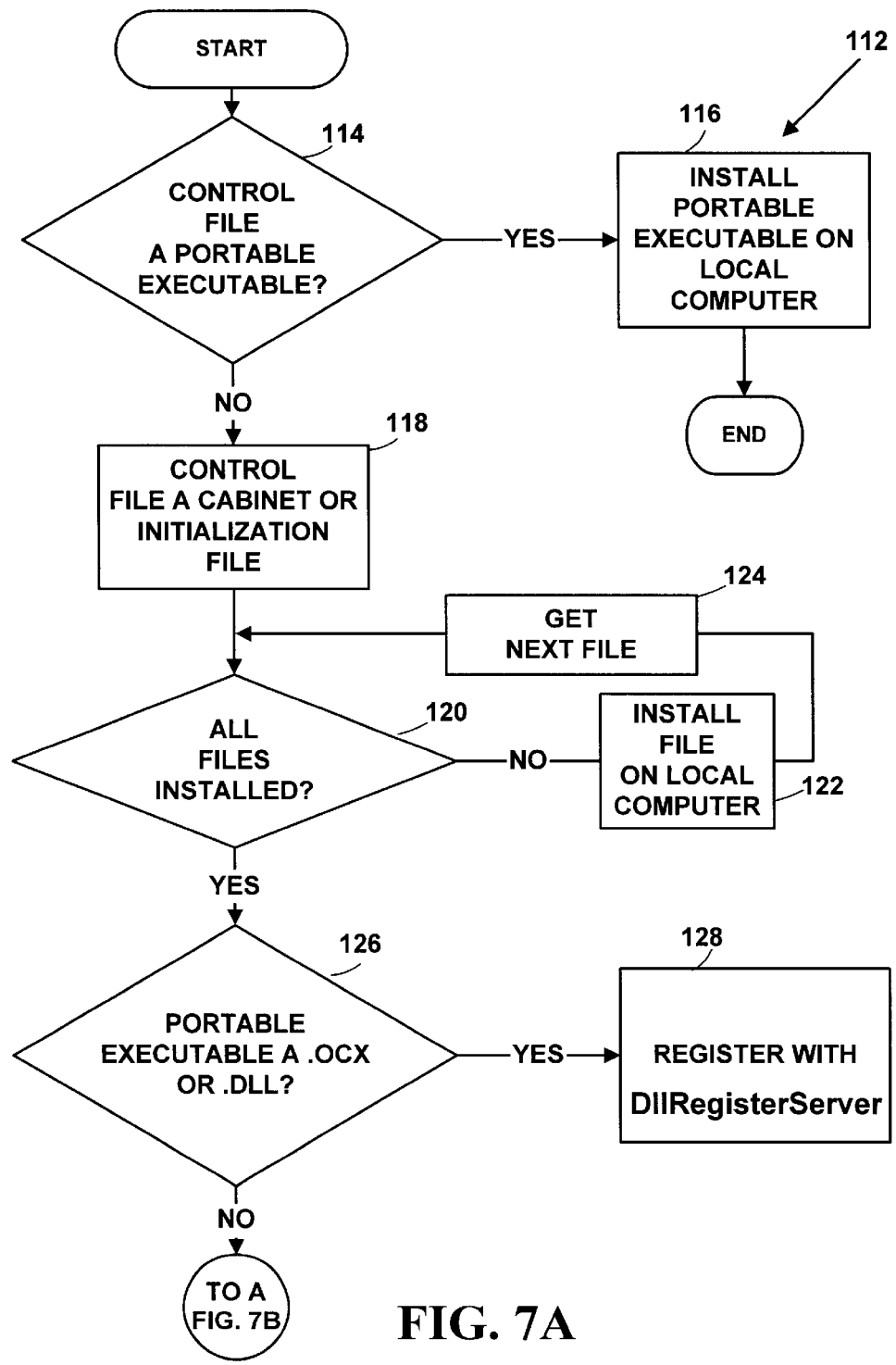
FIGS. 7A–7B are a flow diagram illustrating a registration method for the present invention.
Figure 7B:
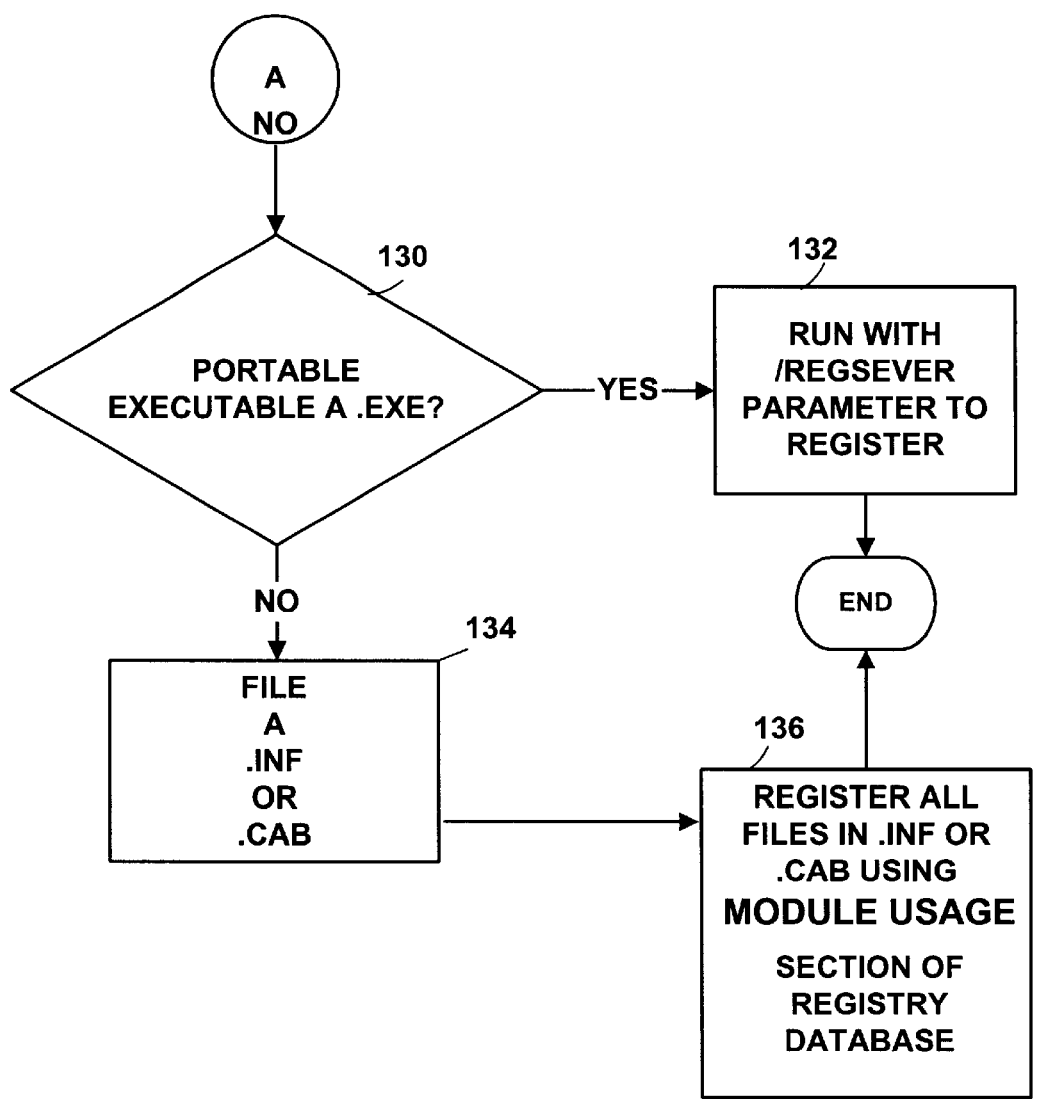

After the code has been verified 72, the control file is installed 74 on the local computer 34 with a code installation module 64. As is shown in FIGS. 7A–7B, method 112 installs 74 and registers 76 the control file. If the control file is a single portable executable file (e.g., .EXE, .OCX, .DLL) 114, the single portable executable file is installed 116 on the local computer 34 by CoGetClassObjectFromURL. If the control file is not a single portable executable 118 (i.e., the file is a .INF or a CAB file), then each of the files referenced in the initialization or cabinet file are installed 120–124 on the local computer 34.

In an illustrative embodiment of the present invention, most of the downloaded software components are installed in a permanent cache store in an operating system directory called "windows\occache." However, other directories could also be used. Some components (e.g., helper DLLs that need to be on the system PATH but currently are not) will also be installed in the "\windows" and "\windows\system" directories. However, other directories could also be used. If there are any problems during installation (e.g., a full disk, access violations, existing older/newer version of a file, etc.), the code install interface function ICodeInstall:OnCodeInstall-Problem is called to make the user aware of the problem.

If the portable executable file is an .OCX or a .DLL file 126, it is registered by calling the DllRegisterServer interface 128. The DllRegisterServer interface is an interface which registers a software component in the registry database of the operating system. However, other registering interfaces could also be used. If the portable executable file is a .EXE file 130 (FIG. 7B), the .EXE is registered during execution with the run-time parameter of "\RegServer" 132. This run-time parameter registers the .EXE file in the registry database of the operating system.

In an illustrative embodiment of the present invention, self-registering software components are used because the .INF format does not provide syntax for changing registry information (for security reasons). For .OCXs, .DLLs, and .EXEs marked as "OleSelfRegister" in the Version resource, self-registration will be attempted. For .DLLs and OCXs, this means loading the .DLL library and calling DllRegisterServer. For .EXEs, this means running the .EXE with the run-time parameter of "/RegServer". This ensures that software components implemented as local servers (e.g. winword.exe) are registered correctly. If an object is not marked as "OleSelfRegister" but registration is necessary, or if it is desired to over-ride the "OleSelfRegister" flag, the following lines can be added to an .INF file:

[foo.ocx]
RegisterServer=no; don't register even if marked OleSelfRegister or
RegisterServer=yes; register this even if not marked OleSelfRegister. This is the
typical workaround for getting old
;controls to register Software components that are a self-extracting .EXE may remain unregistered because the "OleSelfRegister" flag is ignored if the URL points directly at a .EXE file. In this case it is assumed that this is a self-registering .EXE, and this enables self-extracting .EXEs to work correctly as long as they ignore the "/RegServer" command-line parameter. Supporting self-extracting .EXEs enables very complex setup mechanisms to be launched automatically. However, if a self-extracting .EXE is called via this mechanism, then any components that it installs will not be automatically tracked. Such components are permanently installed and may not be available for future cleanup. Every client (e.g., the network browser) of a software module (e.g., .OCX, .DLL, .EXE) is expected to increment and decrement the existing SharedDLLs section in the registry database when the components are registered to allow the operating system to keep track of how many clients are sharing the software components.

Returning to FIG. 7B, if the file is a .INF or .CAB file, all downloaded software components are registered using a new section in the registry database called ModuleUsage 136 that keeps track of such components. The ModuleUsage section in the registry holds a list of "owners" and "clients" for each software module. Thus, the registry can keep track of how many clients a module has (i.e., the SharedDLL count), as well as what software applications executing on the local computer are using the software module. The registry entries for ModuleUsage use the following syntax:

[ModuleUsage]
   [<Fully Qualified Path&File Name>]
   .FileVersion=a,b,c,d
   Owner=Friendly Name/ID of Owner
   <Client ID>=<info peculiar to this client>
   <Client ID>=<info peculiar to this client>
A ModuleUsage section in a sample registry might be:
Under My Computer\HKEY_LOCAL_MACHINE\Software\Microsoft\Windows \CurrentVersion:
[ModuleUsage]
   [c:\windows/system/mfc40.dll]
   .FileVersion=1,4,0,0
   Owner={CLSID of main object rclsid passed to CoGetClassObjectFromURL}
   {CLSID of main object rclsid passed to CoGetClassObject
   FromURL}=<any info, or default>
   AnotherAppID=<any info, or default>
The parameters of ModuleUsage are as follows:

| Key name | Description |
| --- | --- |
| <Fully Qualified Path&File Name> | This is the full path of the shared module. This name has to use "/"s instead of "\"s because the "\" is an invalid char in a key name. |
| .Owner | The application that installs the shared module and creates the original ModuleUsage section will put some identifier in the Owner key section. If the DLL already existed on the system then and this Module Usage key did not exist then the .Owner key should be set to "Unknown" and the DLL should not be removed on uninstall. The owner should always also enlist itself as a client. |
| .File Version | The version number for the shared module. |
| <Client ID> | ID of a client who is using the shared module. The value corresponding to each client key contains client specific information. When the client is Internet Component Download, the <Client ID> is {CLSID of main object rclsid passed to CoGetClassObjectFromURL}, and the client-specific information is a number which serves as a reference count. For other clients, the client-specific information should be the full path of the client, so that if the client is accidentally deleted it is possible to do garbage collection. |

To permit code caching, the "SharedDLLs" section in the registry database is not used exclusively since reference counts are often incorrectly inflated. For example, any application that is re-installed on the local computer increases the reference count in the SharedDLLs section of the registry database even though the software component already had been incremented previously. However, in an illustrative embodiment of the present invention, every client (e.g., network browser) of a software module is expected to increment and decrement the existing Shared-DLLs section in the registry database as well (a client only increments this value once when it adds itself as a client under ModuleUsage). This is to allow a migration path for applications currently implementing only SharedDLLs scheme.

The ModuleUsage registry information complements the reference counts in the SharedDLLs section by remembering which clients are actually using a shared module. The SharedDLLs counting scheme is correct when used with Module Usage registry information and allows caching of downloaded code in the permanent cache store. Furthermore, when downloading files, the ModuleUsage registry information is used as an efficient shortcut for verifying whether a file needs to be overwritten because it is an out-of-date version. In another embodiment of the present invention, the registering step 76 is optional.

Downloaded code installed in the permanent cache store can be removed manually or automatically. In one embodiment of this invention, a user is allowed to clean up downloaded code, either through the UI of the application program (e.g., the network browser) or via UI exposed by the operating system itself (e.g. the 0MICROSOFT WINDOWS 95"shell"). In another alternative embodiment of the present invention, ModuleUsage information is used by the CoGetClassObjectFromURL interface to automatically detect old or unused downloaded code, and automatically delete such code from the permanent cache store.

In another embodiment of the present invention, software can be located 68, downloaded 70 and installed 74, with the verifying 72 and registering 76 steps optional. This allows a user to control more of the automatic code downloading method with other software applications chosen by the user.

For example, a "hook" mechanism is provided to override or customize steps of method 66. In the illustrative embodiment of the present invention, there are two types of hooks: Unconditional (e.g., for a setup program) and Conditional (e.g., for a version of an existing software component) hooks. Unconditional hooks are hooks that are always executed. Conditional Hooks are executed only when a certain selected condition evaluates to TRUE. Hooks are added to the .INF file described above.

Unconditional hooks are used in [Setup Hooks] section of the .INF file. For Unconditional Hooks, the "CODEBASE=" attribute points to a cabinet file "foo.cab" that contains a "foosetup.exe", "foo.ocx" and "foo.inf." file. The setup file "foosetup.exe" run with the "/q" parameter will install the "foo.ocx" file silently in the "windows\occache" directory described above.

For Unconditional hooks, an example initialization file "foo.inf" includes the following:
[Add. Code]
[Setup Hooks]
hook1hook1
[hook]
run=%EXTRACT_DIR%\foosetup.exe/q When the cabinet file foo.cab is opened, it is verified and then the .INF file is processed. Since the [Add.Code] section is empty, the [Setup Hooks] section is processed. The files in the cabinet file "foo.cab" are installed in a unique temporary directory and the command line listed in the "run="attribute is executed (i.e., run=%EXTRACT_DIR%\foosetup.exe /q"). All the files left in the temporary directory after the completion of "foosetup.exe" including "foosetup.exe" are discarded. However, other commands could also be used for the Unconditional Hooks.

Conditional Hooks are run only when a certain condition is evaluated as TRUE. This is typically when the [Add.Code] section points at a certain software component and that software component is not available on the client computer. The above example for Unconditional Hooks could be rewritten using Conditional Hooks.

For Conditional Hooks the "CODEBASE=" attribute also points to a cabinet file "foo.cab" that contains a "foosetup.exe", "foo.ocx" and "foo.inf" file. The file setup file "foosetup.exe" run with the "/q" parameter also installs the file "foo.ocx" silently in the "windows\occache" directory as was described above.

For Conditional Hooks, an example initialization file "foo.inf" includes the following:
[Add.Code]
foo.ocx=foo.ocx
[foo.ocx]
Clsid={. . . }
hook=hook1
[hook1]
run=%EXTRACT_DIR%\foosetup.exe /q When the .INF is opened, it is processed using the [Add.Code] attribute. When the [foo.ocx] section is processed, the Clsid, (e.g. for "foo.ocx") is used to determine if it is registered or available on the client computer by checking the operating system registry. If "foo.ocx" is not registered on the client computer, the hook mentioned in the [hook1] parameter is executed. The execution of [hook1] section is identical to the description of the hook as an Unconditional Hook, but occurs only after checking the CLSID of"foo.ocx." However, other commands could also be used for the Conditional Hooks.

Conditional Hooks can be used to make the verifying 72 and registering 76 steps of method 66 conditional (i.e., optional). This allows a user to use method 66 and system 56 to simply locate, download, and install a desired software component without verification or registration. The verification and/or registration steps could be accomplished by methods different than those described in connection with method 66 and system 56 giving the user greater flexibility over the use of the software components downloaded and installed on the local computer.

In another embodiment of the present invention, the HTML tag <EMBED> is also used to add multi-media or interactive behavior to HTML documents with method 66 and system 56. The <EMBED> tag has three attributes, SRC, WIDTH, and HEIGHT, and may also contain optional parameters that can be sent to a software component (e.g., a Netscape ONE plug-in) handling the embedded data type. The SRC attribute specifies the URL of the source document. The WIDTH attribute specifies the width of the embedded document in pixels. The HEIGHT attribute specifies the height of the embedded document in pixels. There can also be a number of optional parameters passed to a plug-in component with the <EMBED> tag, with PARAMETER_NAME=<PARAMETER_VALUE> (e.g., the parameters described for the <OBJECT> tag above). For more information on the <EMBED> tag, see the *HTML 3, Electronic Publishing on the World Wide Web* book cited above.

When the <EMBED> object tag is encountered in the document by the network browser, the <EMBED> tag is parsed to pull out the <EMBED> tag attributes, and the attributes are used with method 66 and system 56 in a manner similar to that described for the <OBJECT> tag above.

The present invention is not limited to the HTML <OBJECT> and <EMBED> tags. Other HTML tags can also be used to provide method 66 and system 56. In addition, the present invention is not limited to computer system 10 or the browsing environment 34. The invention can also be used in a set-top box, such as those which provide interfaces to cable television and other television networks, in a satellite control box, such as those which provide interfaces to digital and other satellite transmission services. The present invention may also be used in pagers, cellular telephones, personal assistants and other wireless personal communications devices.

When all of the desired computer software components have been located 68, downloaded 70, verified 72, installed 74, and registered 76, any appropriate software components are returned 78 to the client application (e.g., the network browser) which made the request for the computer software components. The software components returned to the client application are then displayed in the document display area 52 on the display device 20 of the local computer 36.

In an illustrative embodiment of the present invention, the MICROSOFT INTERNET EXPLORER 3.0 network browser by Microsoft uses system 56 and method 66 (and methods 80, 96 and 112) to browse HTML documents 46 on the Internet 38. The software interfaces and corresponding software subroutines just described for methods 66 (and methods 80, 96 and 112), and system 56 are available in the Internet Component Download Application Program Interface (API) for the MICROSOFT WINDOWS 95 operating system by Microsoft Corporation.

HTML documents typically contain one or more HTML <OBJECT> or <EMBED> tags. When an HTML <OBJECT> or <EMBED> tag is encountered during browsing, MICROSOFT INTERNET EXPLORER parses the appropriate parameters out of the <OBJECT> and <EMBED> tags and passes them to the CoGetClassObject-FromURL interface as was described above. The HTML <OBJECT> or <EMBED> tags typically point to object oriented applications which provide dynamic or interactive multimedia to an HTML document.

However, other applications which are not network browsers, and do not parse HTML documents with <OBJECT> or <EMBED> tags can also use system 56 and methods 66 to download any type of computer software component from a local or remote computer by passing appropriate parameters to CoGetClassObjectFromURL interface. The computer software components need not provide dynamic or interactive multimedia to a client application. In addition interfaces other than CoGetClassObjectFromURL could also be used.

It should be understood that the programs, processes, and methods described herein are not related or limited to any particular type of computer apparatus, unless indicated otherwise. Various types of general purpose or specialized computer apparatus may be used with or perform operations in accordance with the teachings described herein.

In view of the wide variety of embodiments to which the principles of our invention can be applied, it should be understood that the illustrated embodiments are exemplary only, and should not be taken as limiting the scope of our invention. Rather, we claim as our invention all such embodiments as come within the scope and spirit of the following claims and equivalents thereto.

We claim:

1. A method for automatically downloading and installing computer software on a local computer from one or more remote computers, the local and remote computers being connected to a computer network, the method comprising:

locating automatically a control file on a specific remote computer connected to the computer network, the control file including references to one or more computer software components on the specific remote computer, or one or more links to one or more software components on one or more other remote computers, or one or more software components in a compressed format, and an initialization file that includes information about the version of all files needed for the software components;

downloading automatically to the local computer in an asynchronous manner the one or more of the computer software components referenced in or linked to the control file using a uniform resource locator to locate each of the computer software components;

verifying automatically that each of the computer software components downloaded to the local computer is safe to install on the local computer;

installing automatically each of the verified computer software components in one or more locations on the local computer; and registering automatically each of the installed computer software components in a registry database on the local computer.

2. The method of claim 1, wherein the control file is a single portable executable file.

3. The method of claim 2, wherein the single portable executable file is an executable application file, a dynamic link library file, an object linking and embedding control file, or a network activation control file.

4. The method of claim 1, wherein the locating includes using an object class identifier, a uniform resource locator, or a network search path to locate the control file.

5. The method of claim 1, wherein the verifying uses a digital signature with a digital certificate to verify the computer software components.

6. The method of claim 1, wherein the control file is of a syntax supporting platform independence for the computer software components.

7. One or more computer-readable media comprising computer-executable instructions for performing a method for automatically downloading and installing computer software on a local computer from one or more remote computers, the local and remote computers being connected to a computer network, the method comprising:

locating automatically a control file on a specific remote computer connected to the computer network, the control file including references to one or more computer software components on the specific remote computer, or one or more links to one or more software components on one or more other remote computers, or one or more software components in a compressed format, and an initialization file that includes information about the version of all files needed for the software components;

downloading automatically to the local computer in an asynchronous manner the one or more of the computer software components referenced in or linked to the control file using a uniform resource locator to locate each of the computer software components;

verifying automatically that each of the computer software components downloaded to the local computer is safe to install on the local computer;

installing automatically each of the verified computer software components in one or more locations on the local computer; and registering automatically each of the installed computer software components in a registry database on the local computer.

8. A method for automatically downloading and installing computer software on a local device from one or more remote computers, the local device and remote computers being connected to a computer network, the method comprising:

responsive to encountering a reference to a control file on a remote computer connected to the computer network, automatically locating the control file, wherein the control file is of a syntax supporting platform independence by enumerating choices for a plurality of platforms;

using the control file automatically to determine a location of one or more platform-dependent software components;

downloading automatically to the local device the one or more platform-dependent computer software components; and installing automatically one or more of the platform-dependent computer software components in one or more locations on the local device.

9. The method of claim 8, further comprising verifying automatically that the one or more platform-dependent software components are safe to install on the local device.

10. The method of claim 8, further comprising registering automatically at least one of the platform-dependent computer software components in a database on the local device after installing.

11. The method of claim 8, wherein the local device is one of the following: a set-top box, a satellite control box, a pager, a cellular telephone, a personal assistant, a wireless communication device, and a networked computer.

12. The method of claim 8 wherein the control file comprises references to one or more computer software components on the specific remote computer, one or more links to one or more software components on one or more other remote computers, one or more software components in a compressed format, or one or more executable files.

13. The method of claim 12 wherein the control file further comprises an initialization file that includes information about a version of one or more of the software components.

14. The method of claim 8 wherein the control file comprises a cabinet file.

15. A computer readable medium storing computer-executable instructions for performing a method for automatically downloading and installing computer software on a local device from one or more remote computers, the local device and remote computers being connected to a computer network, the method comprising:

responsive to encountering a reference to a control file on a remote computer connected to the computer network, automatically locating the control file, wherein the control file is of a syntax supporting platform independence by enumerating choices for a plurality of platforms;

using the control file automatically to determine a location of one or more platform-dependent software components;

downloading automatically to the local device the one or more platform-dependent computer software components; and installing automatically one or more of the platform-dependent computer software components in one or more locations on the local device.

16. A system for automatically downloading and installing software from a networked device to a local device, the system comprising;

a locating module that, in response to encountering a tag possessing at least one location parameter, locates software associated with the location parameter on a remote device, wherein the locating module consults a control file having a syntax supporting platform independence for the software;

a data download module that, using the tag location parameter, downloads one or more software components, wherein the data download module pulls software components from different locations depending on a desired platform; and a software installation module that installs the one or more software components on the local device.

17. The system of claim 16 further comprising:

a notification module that provides a notification to a user that a modification to the device has occurred.

18. The system of claim 16, wherein the location parameter comprises a uniform resource locator or a network search path.

19. The system of claim 18, wherein the location parameter references a cabinet file, wherein the one or more software components are found in one or more locations, and wherein the cabinet file contains one or more references to the one or more software locations.

20. The system of claim 18, wherein the location parameter references a control file, and wherein the control file includes at least one of a single portable executable file, a file which contains one or more remote executable files, a library file, and a file which references one or more remote executable files or library files.

21. The system of claim 16, further comprising a verification module that automatically verifies safety of the software.

22. The system of claim 16, further comprising a registration module that automatically registers the software on the local device.

23. The system of claim 16, further comprising a deletion module that automatically deletes old or unused downloaded software components.

24. The system of claim 16, wherein the local device includes a set-top box, a satellite control box, a pager, a cellular telephone, a personal assistant, a wireless communication device, or a networked computer.

25. The system of claim 16, wherein the tag is located in an HTML document.

26. The system of claim 16, wherein the software comprises at least one selected from the group consisting of: an ACTIVEX Control, a NETSCAPE ONE Plugin, a JAVA class library, a multimedia player, a document viewer, a custom control, and an applet.

* * * * *